(12) United States Patent
Kawasaki

(10) Patent No.: US 11,972,197 B2
(45) Date of Patent: Apr. 30, 2024

(54) OCR SYSTEM

(71) Applicant: KYOCERA Document Solutions Inc., Osaka (JP)

(72) Inventor: Tomohiro Kawasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 592 days.

(21) Appl. No.: 17/272,092

(22) PCT Filed: Aug. 8, 2019

(86) PCT No.: PCT/JP2019/031435
§ 371 (c)(1),
(2) Date: Feb. 26, 2021

(87) PCT Pub. No.: WO2020/045039
PCT Pub. Date: Mar. 5, 2020

(65) Prior Publication Data
US 2021/0319248 A1 Oct. 14, 2021

(30) Foreign Application Priority Data

Aug. 27, 2018 (JP) ................. 2018-158182
Aug. 27, 2018 (JP) ................. 2018-158183
Aug. 27, 2018 (JP) ................. 2018-158185

(51) Int. Cl.
*G06F 40/109* (2020.01)
*G06F 40/279* (2020.01)
*G06V 10/98* (2022.01)
*G06V 30/10* (2022.01)
*G06V 30/148* (2022.01)
(Continued)

(52) U.S. Cl.
CPC .......... *G06F 40/109* (2020.01); *G06F 40/279* (2020.01); *G06V 10/98* (2022.01); *G06V 30/10* (2022.01); *G06V 30/153* (2022.01); *G06V 30/245* (2022.01); *G06V 30/412* (2022.01)

(58) Field of Classification Search
CPC ..... G06F 40/109; G06F 40/279; G06V 10/98; G06V 30/10; G06V 30/153; G06V 30/245; G06V 30/412
See application file for complete search history.

(56) References Cited

U.S. PATENT DOCUMENTS 7,925,082 B2    4/2011  Itoh
10,503,993 B2  12/2019  Nishio
(Continued)

FOREIGN PATENT DOCUMENTS

JP    10298795 A    4/1990
JP   2003303315 A   10/2003
(Continued)

*Primary Examiner* — Umair Ahsan
(74) *Attorney, Agent, or Firm* — Studebaker & Brackett PC

(57) ABSTRACT

An OCR system which acquires character data from a form (50) through OCR processing is characterized by: managing an OCR information table (34e) in which an issuer name of an issuer on the form (50) is associated with a font name of a font used in the OCR processing; and, when the OCR processing is performed on an issuer-recorded content reading target area in the form (50), performing the OCR processing (S156) in the font indicated by the font name associated in the OCR information table with the issuer name of the issuer of the form (50).

5 Claims, 25 Drawing Sheets

(51) Int. Cl.
*G06V 30/244* (2022.01)
*G06V 30/412* (2022.01)

(56) References Cited

U.S. PATENT DOCUMENTS

2007/0206851 A1    9/2007  Itoh
2018/0039847 A1*   2/2018  Nishio .................... G06F 18/22

FOREIGN PATENT DOCUMENTS

| JP | 2007233900 A |   | 9/2007 |
| JP | 2010073201 A |   | 4/2010 |
| JP | 2016126796 A | * | 7/2016 |
| JP | 2017091419 A |   | 5/2017 |
| JP | 2018025885 A |   | 2/2018 |
| JP | 2018124854 A |   | 8/2018 |
| KR | 100664421 B1 | * | 1/2007 |

* cited by examiner

34e OCR information table

| Issuer name reading target area | Issuer name | Logo image | Issuer name content reading target area | Font name | OCR reliability |
|---|---|---|---|---|---|
| (x1,y1)−(x2,y2) | ABC COMPANY | LOGO1.JPG | (x3,y3)−(x4,y4) | Calibri | High |
| (x5,y5)−(x6,y6) | DEF COMPANY | LOGO2.JPG | (x7,y7)−(x8,y8) | Arial | Low |
| . | . | . | . | . | . |

FIG. 6

| Form data ID | Correction status | Notification type | Font name | Character data |
|---|---|---|---|---|
| D001 | Uncorrected | Low reliability | Arial | D001a.xlsx |
| ... | ... | ... | ... | ... |

34f Correction information database

| Form data ID | Correction status | Notification type | Font name (1st font) | Character data (1st font) | Font name (2nd font) | Character data (2nd font) |
|---|---|---|---|---|---|---|
| D001 | Uncorrected | Low reliability | Arial | D001a.xlsx | Calibri | D001b.xlsx |
| . | . | . | . | . | . | . |
| . | . | . | . | . | . | . |
| . | . | . | . | . | . | . |

334f Correction information database

FIG. 18

OCR SYSTEM

TECHNICAL FIELD

The present invention relates to an OCR system which acquires character data from a document through OCR processing.

BACKGROUND ART

A conventional OCR system is known which acquires character data from a specific area in a text through OCR processing (refer to Patent Literature 1, for example).

CITATION LIST

Patent Literature

[Patent Literature 1]
Japanese Patent Application Laid-Open Publication No. 2010-073201

SUMMARY OF INVENTION

Technical Problem

However, a problem arises in the conventional OCR system when a font type of characters in a specific area in a text differs from the font type used in OCR processing on the area. In this case, the recognition accuracy of the characters decreases in OCR processing.

Furthermore, a problem arises in the conventional OCR system when correction is received to character data acquired from the text through OCR processing. In this case, if the reliability of OCR processing differs for each text, the burden of correction work for character data is great because a user cannot perceive the reliability of OCR processing on the text.

In addition, a problem arises in the conventional OCR system when a specific information mark is not superimposed on one or more characters of a character string which the user wishes to be acquired as specific information. In this case, the character string desired by the user cannot be appropriately acquired because characters without the specific information mark superimposed thereon cannot be acquired as a portion of the specific information.

Therefore, an object of the present invention is to provide an OCR system capable of improving character recognition accuracy in OCR processing.

Another objective of the present invention is to provide an OCR system capable of reducing the burden of correction work for character data acquired from a text through OCR processing.

Yet another objective of the present invention is to provide an OCR system capable of increasing the possibility of appropriately acquiring a character string desired by a user.

Solution to Problem

According to a first aspect of the present invention, an OCR system which acquires character data from a text through OCR processing includes: an OCR information management section which manages OCR information in which identification information of an issuer of the text is associated with a type of a font used in the OCR processing; and an OCR performance section which performs the OCR processing on the text. When performing the OCR processing on a specific area in the text, the OCR performance section performs the OCR processing in the font of the type associated in the OCR information with the identification information of the issuer of the text.

According to a second aspect of the present invention, an OCR system which acquires character data from a text through OCR processing includes: an OCR information management section which manages OCR information in which identification information of an issuer of the text is associated with reliability of the OCR processing on the text issued by the issuer; an OCR performance section which performs the OCR processing on the text; and a correction receiving section which receives correction of the character data. When performing the OCR processing on a marked text as the text which is a text with a reliability mark for indicating the reliability applied thereto, the OCR performance section acquires the reliability indicated by the reliability mark. The OCR information management section adds to the OCR information the reliability acquired from the marked text by the OCR performance section. When the character data of the text is corrected, the correction receiving section performs notification corresponding to the reliability associated in the OCR information with the identification information of the issuer of the text.

According to a third aspect of the present invention, an OCR system which acquires character data from a text through OCR processing includes an OCR performance section which performs the OCR processing on the text. When performing the OCR processing on a marked text as the text which is a text with a specific information mark for acquiring specific information applied thereto, the OCR performance section acquires a character string as the specific information, the character string being composed by at least a portion of characters in the same row as characters on which the specific information mark is superimposed, the character string including the characters on which the specific information mark is superimposed, the character string having an internal distance between mutually adjacent characters of no greater than a specific distance.

Advantageous Effects of Invention

The OCR system of the present invention can improve character recognition accuracy in OCR processing.

The OCR system of the present invention can also reduce the burden of correction work for character data acquired from a text through OCR processing.

In addition, the OCR system of the present invention can increase the possibility of appropriately acquiring a character string desired by a user.

BRIEF DESCRIPTION OF DRAWINGS

FIG. 6 is a diagram illustrating an example of an OCR information table illustrated in FIG. 4.

FIG. 18 is a diagram illustrating an example of a correction information database stored in a form data management system of an OCR system according to a second embodiment of the present invention.

DESCRIPTION OF EMBODIMENTS

The following describes embodiments of the present invention using the accompanying drawings.

First Embodiment

First, a configuration of an optical character recognition (OCR) system is described according to a first embodiment of the present invention.

Figure 1:
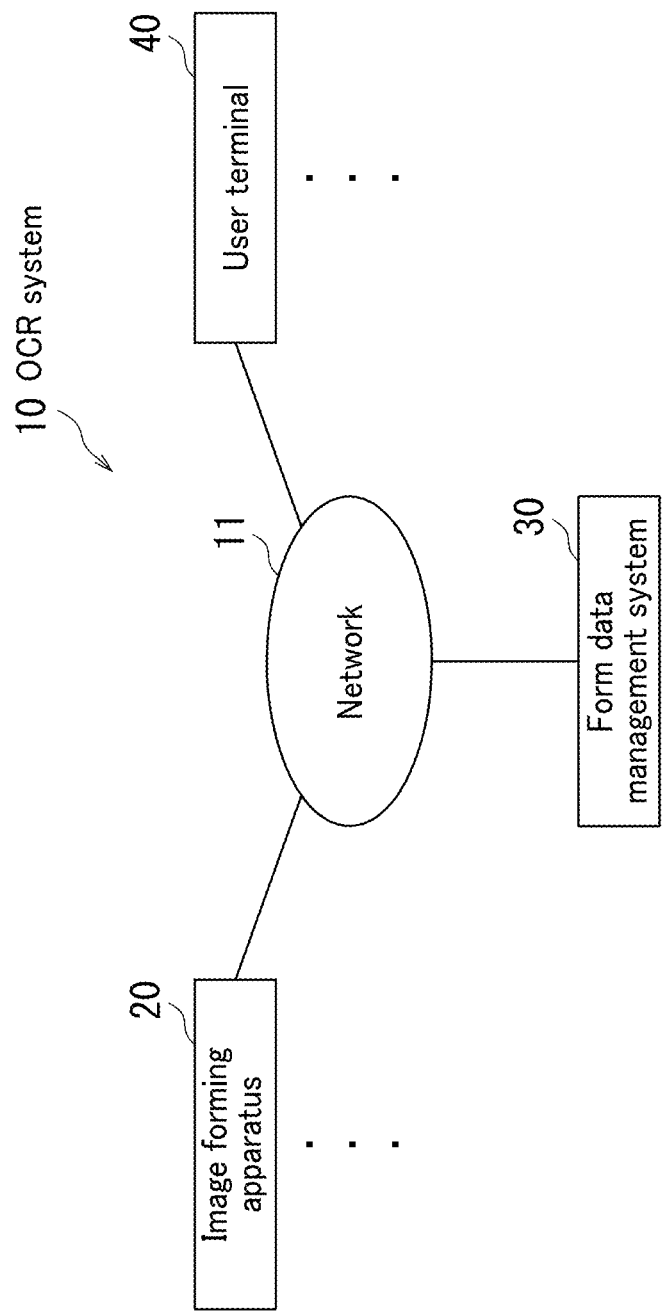
FIG. 1 is a block diagram of an OCR system according to a first embodiment of the present invention.

FIG. 1 is a block diagram of an OCR system 10 according to the present embodiment.

As illustrated in FIG. 1, the OCR system 10 includes an image forming apparatus 20 serving as a reading device which reads an image from a document. The image forming apparatus 20 is composed by an image forming apparatus such as a multifunction peripheral (MFP) or a scanner. Other than the image forming apparatus 20, the OCR system 10 may include at least one image forming apparatus configured in the same manner as the image forming apparatus 20.

The OCR system 10 includes a form data management system 30 which manages data of a form (referred to in the following as "form data") that is a digitized text. The form data management system 30 may by composed by one computer, or may be composed by a plurality of computers. The form data management system 30 may be a system which operates in the cloud.

Figure 2:
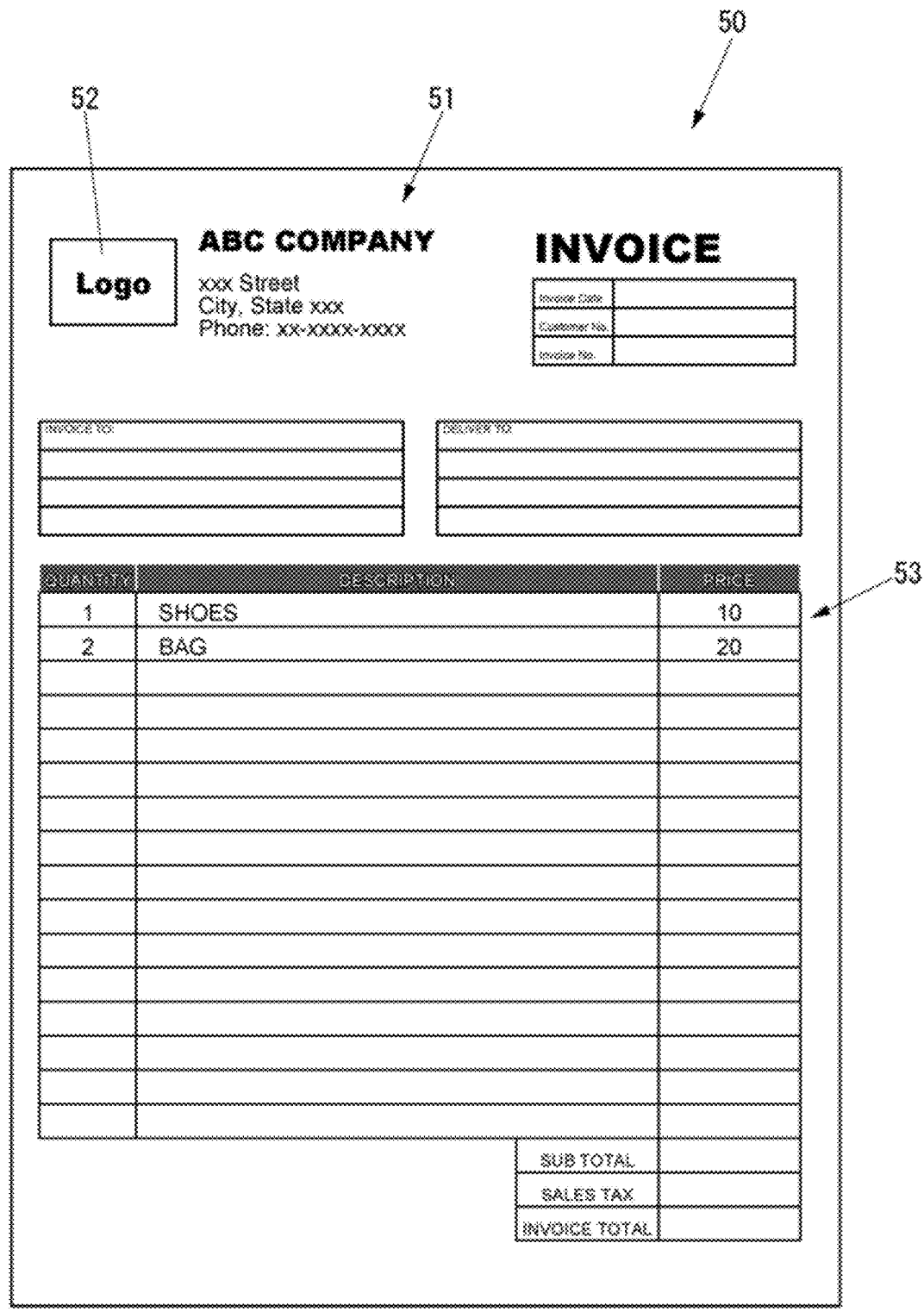
FIG. 2 is a diagram illustrating an example of a form corresponding to form data managed by a form data management system illustrated in FIG. 1.

FIG. 2 illustrates an example of a form 50 corresponding to form data managed by the form data management system 30.

The form 50 illustrated in FIG. 2 includes an issuer name 51 as identification information of an issuer, a logo image 52 of the issuer, and specific content (referred to in the following as "issuer-recorded content") 53 recorded by the issuer. In FIG. 2, the issuer name 51 is "ABC COMPANY".

As illustrated in FIG. 1, the OCR system 10 includes a user terminal 40 used by a user such as a data confirmer who confirms the form data. The user terminal 40 is composed by for example a computer such as a personal computer (PC). Besides the user terminal 40, the OCR system 10 may include at least one user terminal having the same configuration as that of the user terminal 40.

The image forming apparatus 20 and the form data management system 30 included in the OCR system 10 are capable of communication with each other through a network 11 such as a local area network (LAN) or the Internet. The form data management system 30 and the user terminal 40 included in the OCR system 10 are capable of communication with each other through the network 11.

Figure 3:
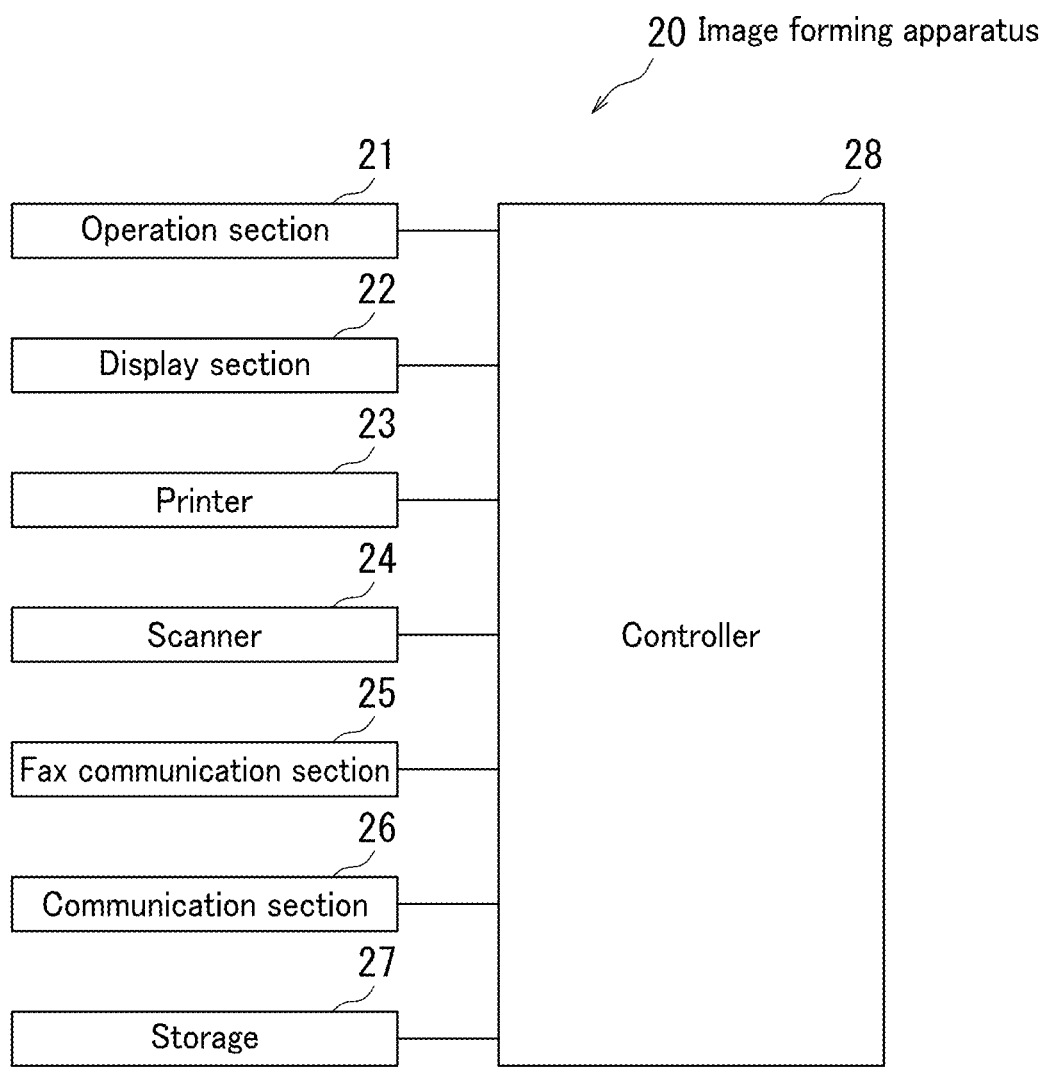
FIG. 3 is a block diagram of an image forming apparatus illustrated in FIG. 1 in a case in which the image forming apparatus is a multifunction peripheral (MFP).

FIG. 3 is a block diagram of the image forming apparatus 20 in a case in which the image forming apparatus 20 is an MFP.

The image forming apparatus 20 illustrated in FIG. 3 includes an operation section 21, a display section 22, a printer 23, a scanner 24, a fax communication section 25, a communication section 26, storage 27, and a controller 28. The operation section 21 is an operation device to which various operations are input. Examples of the operation device include buttons. The display section 22 is a display device such as a liquid-crystal display (LCD) which displays various information. The printer 23 is a printing device which prints an image on a recording medium such as paper. The scanner 24 is a reading device which reads an image from a document. The fax communication section 25 is a fax device which performs fax communication with an unillustrated external fax machine through a communication line such as a public telephone line. The communication section 26 is a communication device which performs communication with an external apparatus through a network such as a LAN or the Internet, or directly in a wired or wireless manner without going through a network. The storage 27 is a non-volatile storage device such as semiconductor memory or a hard disk drive (HDD) which stores various information. The controller 28 controls the entirety of the image forming apparatus 20.

The controller 28 includes for example a central processing unit (CPU), read-only memory (ROM) which stores programs and various data, and random-access memory (RAM) serving as memory for use as a work area of the CPU of the controller 28. The CPU of the controller 28 executes a program stored in the storage 27 or the ROM of the controller 28.

Figure 4:
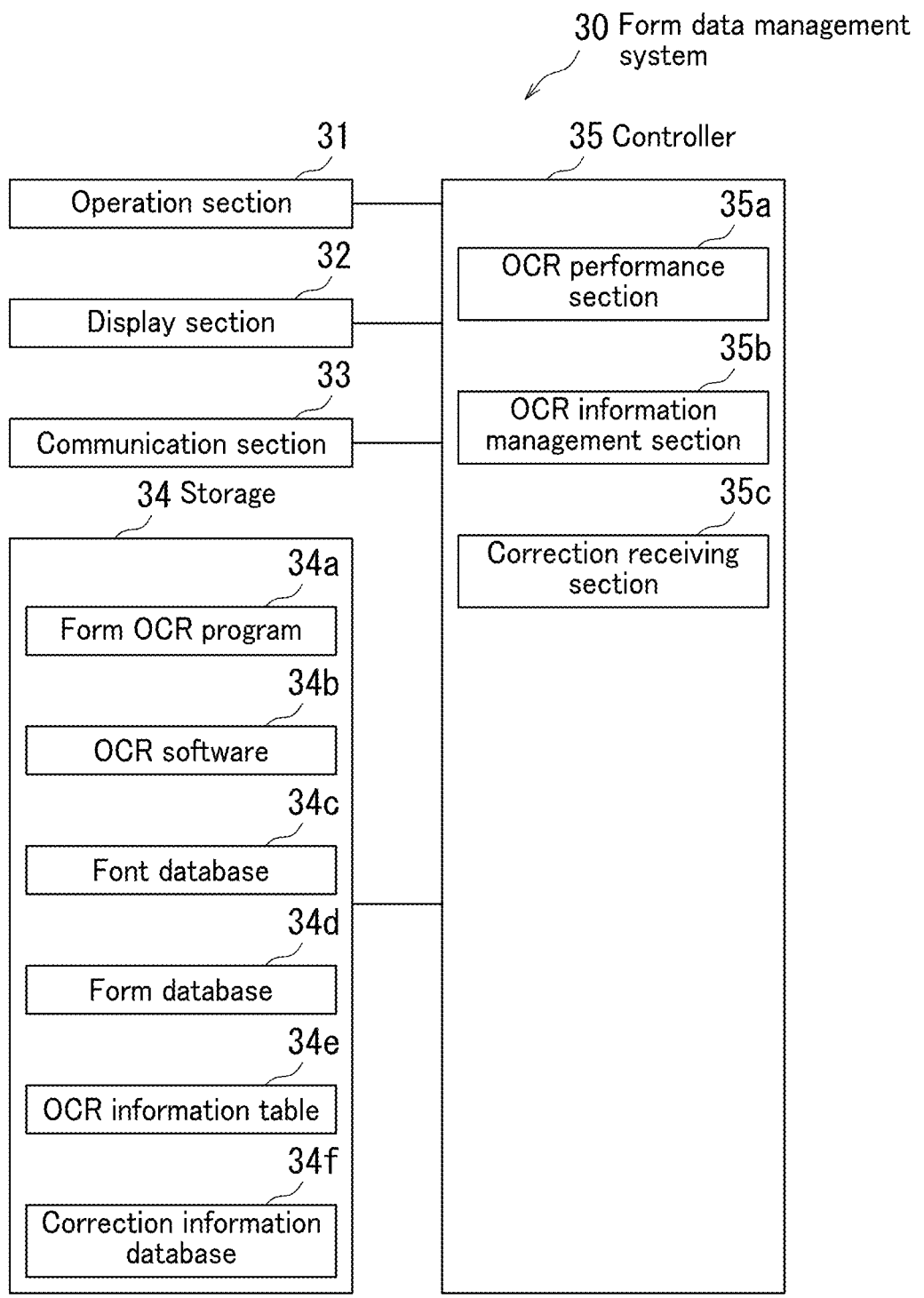
FIG. 4 is a block diagram of the form data management system illustrated in FIG. 1 in a case in which the form data management system is composed by one computer.

FIG. 4 is a block diagram of the form data management system 30 in a case in which the form data management system 30 is composed by one computer.

The form data management system 30 illustrated in FIG. 4 includes an operation section 31, a display section 32, a communication section 33, storage 34, and a controller 35. The operation section 31 is an operation device to which various operations are input. Examples of the operation device include a keyboard and a mouse. The display section 32 is a display device which displays various information. Examples of the display device include an LCD. The communication section 33 is a communication device which performs communication with an external apparatus through a network such as a LAN or the Internet, or directly in a wired or wireless manner without going through a network. The storage 34 is a non-volatile storage device which stores various information. Examples of the storage device include semiconductor memory and an HDD. The controller 35 controls the entirety of the form data management system 30.

The storage 34 stores a form OCR program 34a serving as a text OCR program, OCR software 34b, and a font database 34c. The text OCR program is a program for acquiring character data from a form through OCR processing. The font database 34c saves fonts used by the OCR software 34b. The form OCR program 34a, the OCR software 34b, and the font database 34c may for example be installed to the form data management system 30 in a manufacturing stage of the form data management system 30, may be additionally installed to the form data management system 30 from an external recording medium such as a compact disk (CD), a digital versatile disk (DVD), or Universal Serial Bus (USB) memory, or may be additionally installed to the form data management system 30 through a network.

The storage 34 stores a form database 34d in which form data is saved.

Figure 5:
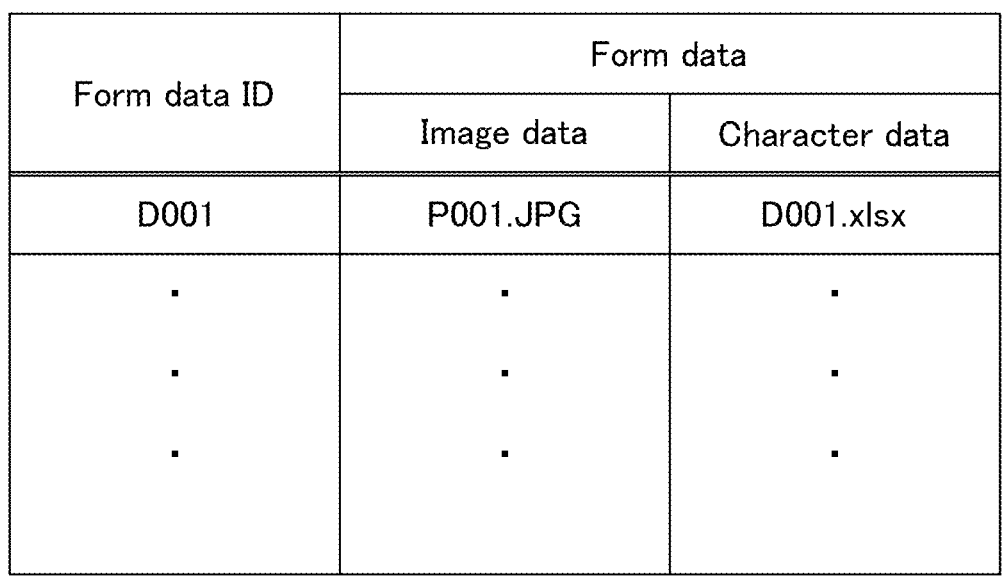
FIG. 5 is a diagram illustrating an example of a form database illustrated in FIG. 4.

FIG. 5 is a diagram illustrating an example of the form database 34d.

The form database 34d illustrated in FIG. 5 includes form data and a form data ID as identification information of the form data in association with each other on a piece-by-piece basis of the data. Each piece of form data includes image data of a form and character data of a form. For example, in FIG. 5, a form data ID "D001", image data "D001.JPG", and character data "D001.xlsx" are associated with each other.

As illustrated in FIG. 4, the storage 34 stores the OCR information table 34e in which OCR information is saved as information for OCR processing.

FIG. 6 is a diagram illustrating an example of the OCR information table 34e.

The OCR information table 34e illustrated in FIG. 6 includes an issuer name reading target area, an issuer name of an issuer of a form, a logo image, an issuer-recorded content reading target area, a font name, and a reliability of OCR processing in association with one another on an issuer-by-issuer basis. The issuer name reading target area is an area in the form 50 from which the issuer name 51 is to be read. A logo image is an image of an issuer indicated by an issuer name. The issuer-recorded content reading target area is an area in the form 50 from which the issuer-recorded content 53 is to be read. The font name indicates the type of the font of characters in the issuer-recorded content reading target area in the form 50. The reliability of OCR processing is the degree to which OCR processing performed on the form 50 issued by the issuer indicated by the issuer name is reliable. For example, in FIG. 6, an issuer name reading target area "(x1,y1)-(x2,y2)", an issuer name "ABC COMPANY", a logo image "LOGO1.JPG", an issuer-recorded content reading target area "(x3,y3)-(x4,y4)", a font name "Calibri", and a reliability "high" of OCR processing are associated with one another.

The issuer name reading target area and the issuer-recorded content reading target area are expressed by coordinates in image data.

The logo image is registered to the OCR information table 34e by a manager who has the data confirmer confirm the form data.

As illustrated in FIG. 4, the storage 34 stores a correction information database 34f indicating a correction status of form data and a type of notification (referred to in the following as a "notification type") for each piece of form data. The notification is for alerting when character data of a form is to be corrected.

Figure 7:
FIG. 7 is a diagram illustrating an example of a correction information database illustrated in FIG. 4.

FIG. 7 is a diagram illustrating an example of the correction information database 34f.

The correction information database 34f illustrated in FIG. 7 includes a form data ID, a correction status of form data, a notification type, and a font name of a font used in OCR processing, and character data in association with each other on a piece-by-piece basis of form data. The character data is data generated through OCR processing in the font indicated by the font name. For example, in FIG. 7, a form data ID "D001", a correction status "uncorrected" of form data, a notification type "low reliability", a font name "Arial" of a font used in OCR processing, and character data "D001a.xlsx" generated through OCR processing in the font indicated by the font name are associated with one another.

"Uncorrected" and "corrected" are examples of the correction status of the form data.

"High reliability", "low reliability", "suboptimal area", "suboptimal font", and "suboptimal area and font" are examples of the notification type. "High reliability" indicates that the reliability of OCR processing is high as a result of OCR processing being performed on an optimal area of the form in an optimal font. "Low reliability" indicates that OCR processing was performed on an optimal area of the form in an optimal font but the reliability of the OCR processing is low. "Suboptimal area" indicates that OCR processing was performed in an optimal font on an area of the form which is not optimal. "Suboptimal font" indicates that OCR processing was performed on an optimal area of the form in a font which is not optimal. "Suboptimal area and font" indicates that OCR processing was performed on an area of the form which is not optimal in a font which is not optimal.

The controller 35 illustrated in FIG. 4 includes a CPU, ROM which stores programs and various data, and RAM serving as memory used as a work area of the CPU of the controller 35, for example. The CPU of the controller 35 executes a program stored in the storage 34 or the ROM of the controller 35.

The controller 35 realizes an OCR performance section 35a, an OCR information management section 35b, and a correction receiving section 35c by executing the form OCR program 34a. The OCR performance section 35a performs OCR processing on the form 50 using the OCR software 34b. The OCR information management section 35b manages the OCR information table 34e. The correction receiving section 35c receives correction of the character data acquired from the form 50 through OCR processing.

Figure 8:
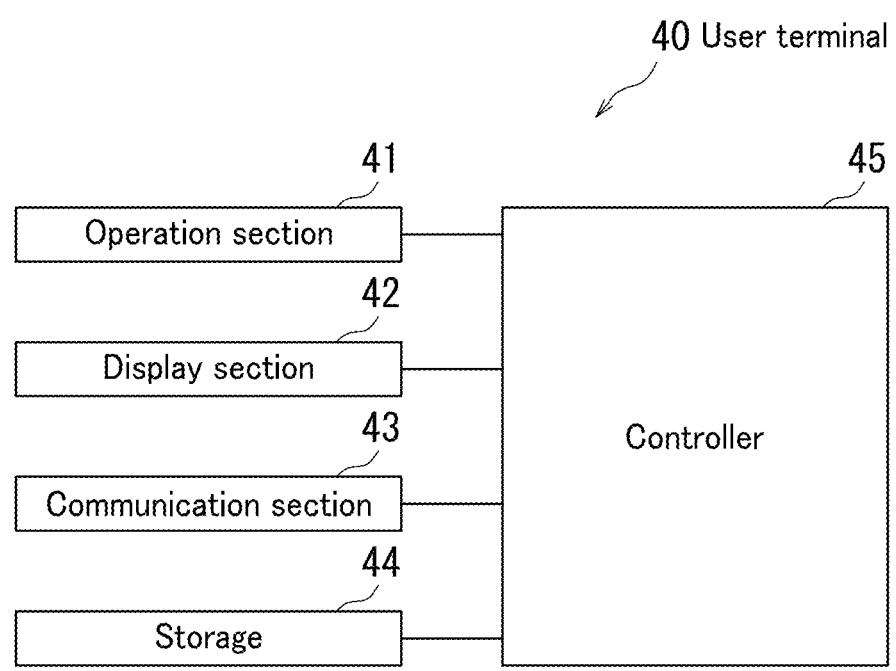
FIG. 8 is a block diagram of a user terminal illustrated in FIG. 1.

FIG. 8 is a block diagram of the user terminal 40.

The user terminal 40 illustrated in FIG. 8 includes an operation section 41, a display section 42, a communication section 43, storage 44, and a controller 45. The operation section 41 is an operation device to which various operations are input. Examples of an operation device include a keyboard and a mouse. The display section 42 is a display device which displays various information. Examples of the display device include an LCD. The communication section 43 is a communication device which performs communication with an external apparatus through a network such as a LAN or the Internet, or directly in a wired or wireless manner without going through a network. The storage 44 is a non-volatile storage device which stores various information. Examples of the non-volatile storage device include semiconductor memory and an HDD. The controller 45 controls the entirety of the user terminal 40.

The controller 45 includes a CPU, ROM which stores programs and various data, and RAM serving as memory used as a work area of the CPU of the controller 45, for example. The CPU of the controller 45 executes a program stored in the storage 44 or the ROM of the controller 45.

Next, operation of the OCR system 10 is described.

First, the operation of the OCR system 10 is described in a case in which the OCR information table 34e is updated.

Figure 9:
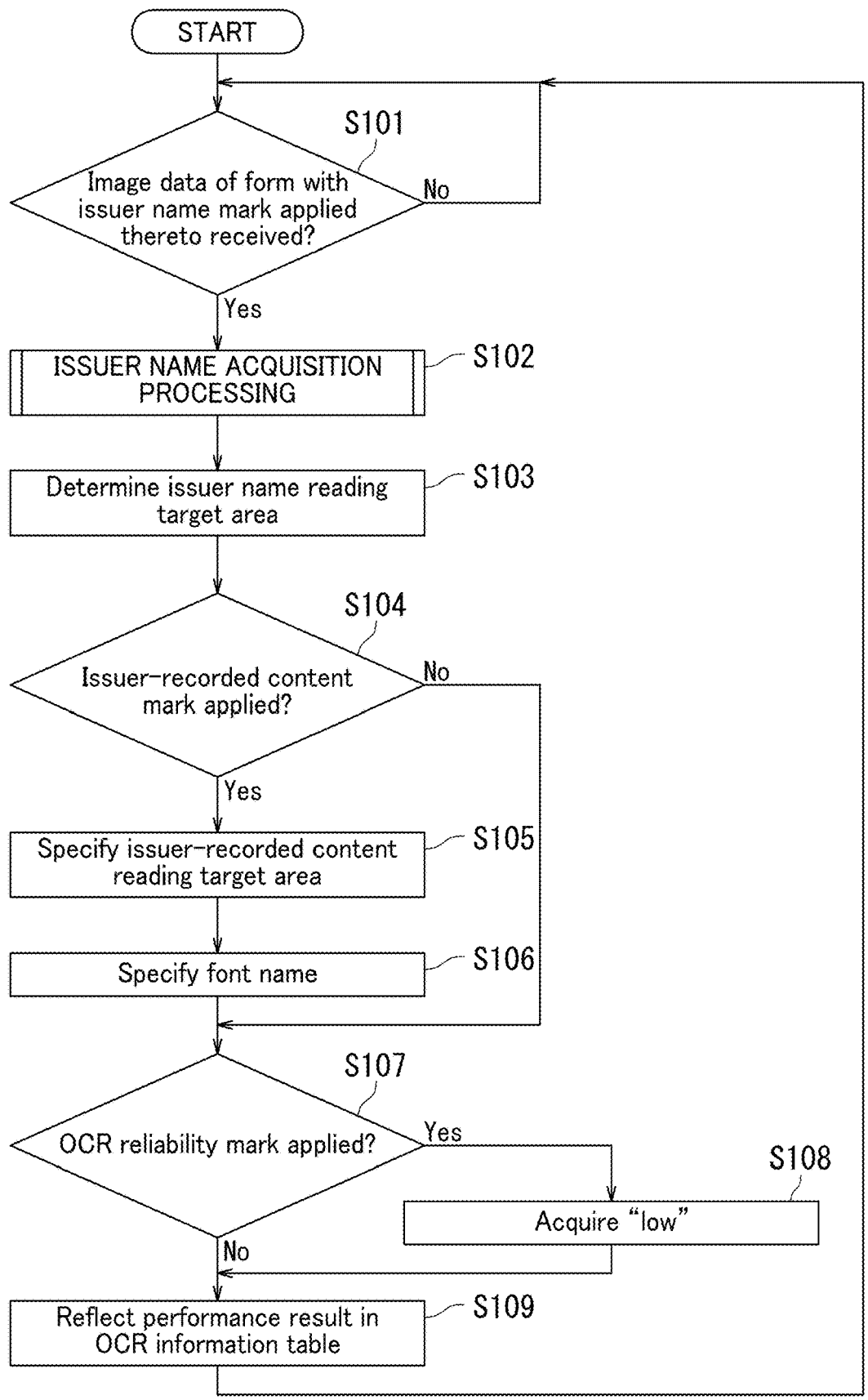
FIG. 9 is a flowchart of operation of the form data management system illustrated in FIG. 4 in a case in which the OCR information table is updated.

FIG. 9 is a flowchart of operation of the form data management system 30 in a case in which the OCR information table 34e is updated.

As illustrated in FIG. 9, the OCR performance section 35a of the form data management system 30 determines whether or not image data of a form with an issuer name mark (identification information mark) for specifying an issuer name applied thereto has been received until determining that image data of the form 50 with an issuer name mark applied thereto has been received (S101). For example, after the manager who has the data confirmer confirm the form data applies a specific mark to a paper form 50 using a highlighter pen or the like, the image data of the form 50 with the issuer name mark applied thereto may be generated as image data by reading the form 50 with the specific mark applied thereto using the scanner 24 of the image forming apparatus 20. The generated image data of the form 50 may then be sent from the image forming apparatus 20 to the form data management system 30. Alternatively, after the specific mark on the image data of the form 50 is applied to the image data using the user terminal 40, the image data of the form 50 with the issuer name mark applied thereto may be sent from the user terminal 40 to the form data management system 30.

Figure 10:
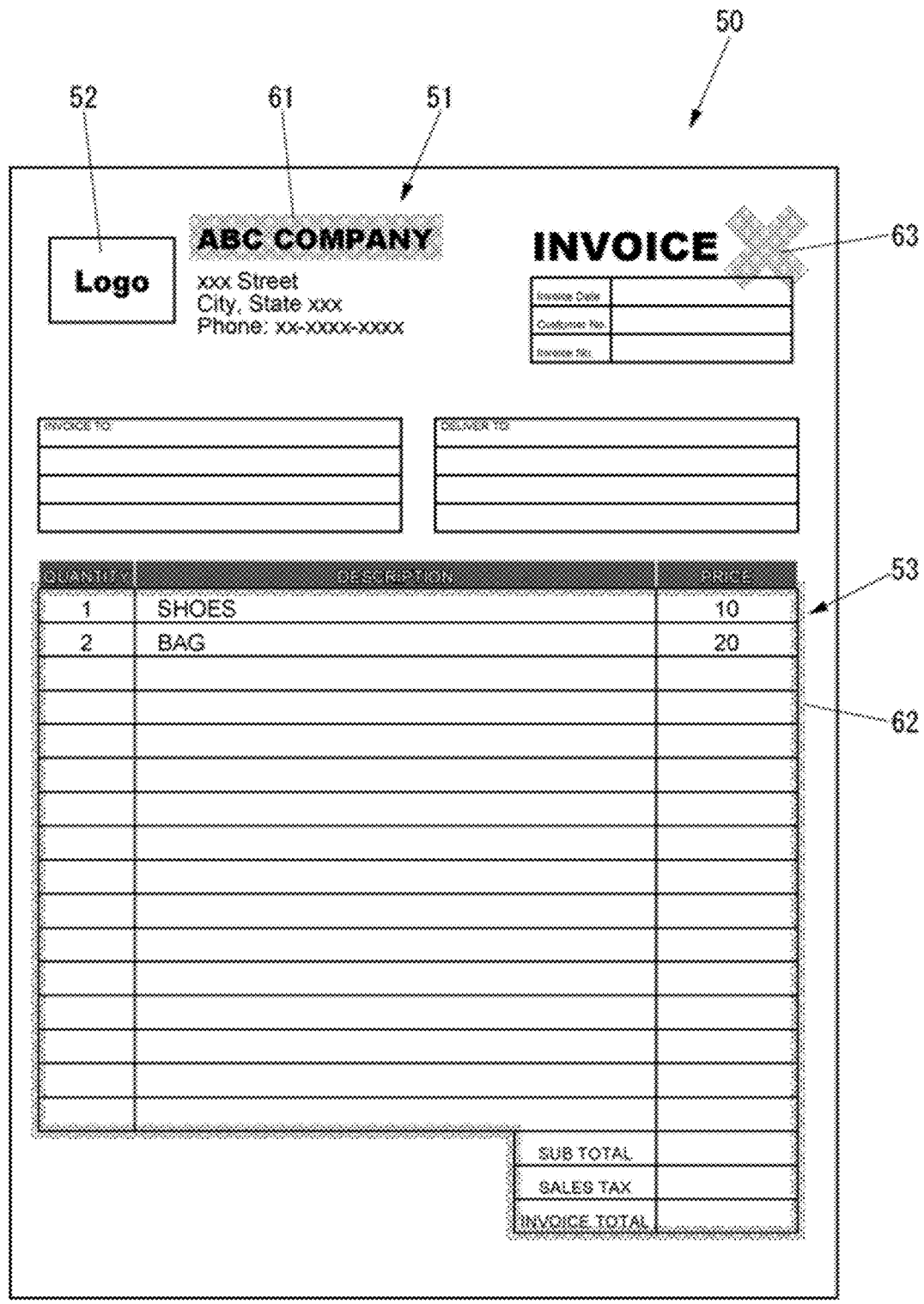
FIG. 10 is a diagram illustrating an example of the form illustrated in FIG. 2 with a specific mark applied thereto.

FIG. 10 is a diagram illustrating an example of the form 50 with specific marks applied thereto.

The form 50 illustrated in FIG. 10 is a marked text including an issuer name mark 61, an issuer-recorded content mark 62, and an OCR reliability mark 63 as specific marks. The issuer name mark 61 is an identification information mark for acquiring the issuer name 51 from the form 50. The issuer name mark 61 is a filling with a specific fluorescent color on at least a portion of the issuer name 51 in the form 50. The issuer-recorded content mark 62 is an area mark for specifying an issuer-recorded content reading target area in the form 50. The issuer-recorded content mark 62 is a box with a fluorescent color around the issuer-recorded content reading target area in the form 50. The OCR reliability mark 63 is a reliability mark for indicating the reliability of OCR processing on a form issued by the issuer indicated by the issuer name 51. The OCR reliability mark 63 is an X mark drawn in a fluorescent color on the form 50.

The issuer name mark 61, the issuer-recorded content mark 62, and the OCR reliability mark 63 are for example applied to the paper form 50 or to the image data of the form 50 by the manager who has the data confirmer confirm the form data. The OCR reliability mark 63 is for example applied based on character recognition accuracy in past OCR processing performed on a form issued by the issuer of the form 50. The OCR reliability mark 63 is for example applied to the paper form 50 or the image data of the form 50 by the manager.

As illustrated in FIG. 9, upon determination in S101 that image data of the form 50 with the issuer name mark 61 applied thereto has been received, the OCR performance section 35a performs issuer name acquisition processing to acquire the issuer name (S102).

Figure 11:
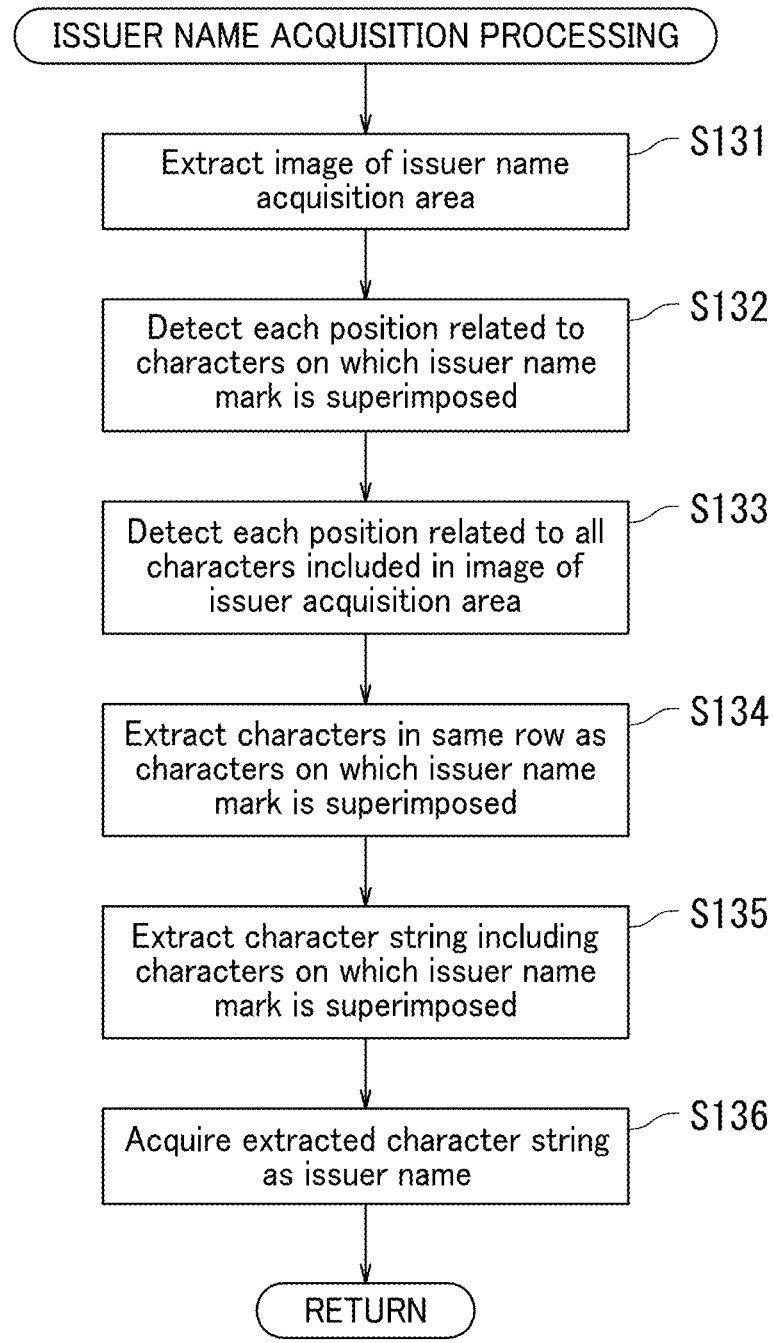
FIG. 11 is a flowchart of issuer name acquisition processing illustrated in FIG. 9.

FIG. 11 is a flowchart of the issuer name acquisition processing.

The operation illustrated in FIG. 11 is an example of operation in a case in which the orientation of a character string in the issuer name in an image (referred to in the following as a "target form image") indicated by the image data of the form 50 determined to be received in S101 of FIG. 9 is horizontal in the target form image, and the height orientation of characters of the issuer name in the target form image is vertical in the target form image.

As illustrated in FIG. 11, the OCR performance section 35a extracts an image of a specific area (referred to in the following as an "issuer name acquisition area") in the target form image from which the issuer name is to be acquired (S131). The issuer name acquisition area is a rectangular area including a pair of opposite sides extending in the vertical direction in the target form image and a pair of opposite sides extending in the horizontal direction in the target form image.

The position of the upper edge of the issuer name acquisition area may be an uppermost position in the vertical direction of the issuer name mark in the target form image, or may be a position above the uppermost position in the vertical direction of the issuer name mark in the target form image by a specific distance. Here, the specific distance may be a distance corresponding to a distance (referred to in the following as a "mark vertical width") from the uppermost position in the vertical direction of the issuer name mark in the target form image to the lowermost position therein, or may be a fixed distance independent of the mark vertical width.

The position of the lower edge of the issuer name acquisition area may be a lowermost position in the vertical direction of the issuer name mark in the target form image, or may be a position below the lowermost position in the vertical direction of the issuer name mark in the target form image by a specific distance. Here, the specific distance may be a distance corresponding to the mark vertical width, or may be a fixed distance independent of the mark vertical width.

The position of the left edge of the issuer name acquisition area may be the same as the position of the left edge in the target form image, or may be a position to the left of a leftmost position in the horizontal direction of the issuer name mark in the target form image by a specific distance. Here, the specific distance may be a distance corresponding to a distance (referred to in the following as "mark horizontal width") from a leftmost position in the horizontal direction of the issuer name mark in the target form image to a rightmost position therein, or may be a fixed distance independent of the mark horizontal width.

The position of the right edge of the issuer name acquisition area may be the same as the position of the right edge in the target form image, or may be a position to the right of a rightmost position in the horizontal direction of the issuer name in the target form image by a specific distance. Here, the specific distance may be a distance corresponding to the mark horizontal width, or may be a fixed distance independent of the mark horizontal width.

Figure 12:
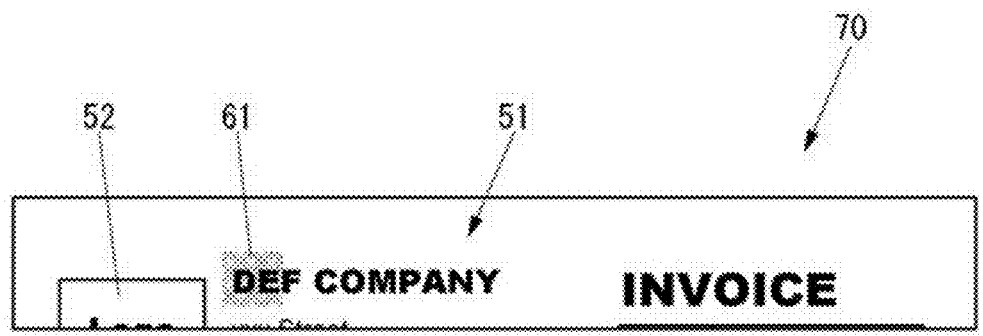
FIG. 12 is a diagram illustrating an example of an issuer name acquisition area extracted in the issuer name acquisition processing illustrated in FIG. 11.

FIG. 12 is a diagram illustrating an example of an issuer name acquisition area 70 extracted in the issuer name acquisition processing illustrated in FIG. 11.

In the issuer name acquisition area 70 illustrated in FIG. 12, characters on which the issuer name mark 61 is superimposed are only "DE" in "DEF COMPANY" which is the issuer name 51.

As illustrated in FIG. 11, after the processing of S131, the OCR performance section 35*a* detects the uppermost, lowermost, and central positions in the vertical direction for characters on which the issuer name mark 61 is superimposed in the image of the issuer name acquisition area 70 extracted in S131 (S132).

Figure 13:
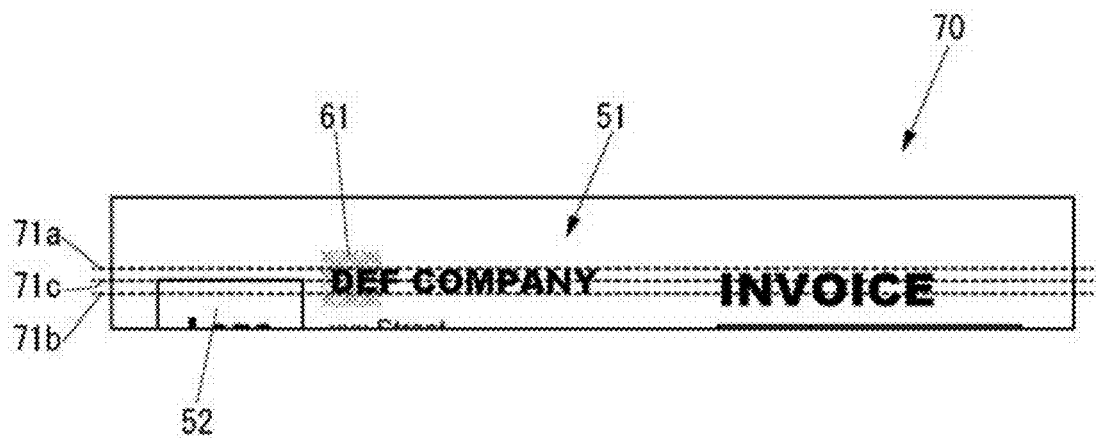
FIG. 13 is a diagram illustrating an example of a position detected in the issuer name acquisition processing illustrated in FIG. 11.

FIG. 13 is a diagram illustrating an example of a position detected in the issuer name acquisition processing illustrated in FIG. 11.

In the issuer name acquisition area 70 illustrated in FIG. 13, a position 71*a* is the uppermost position in the vertical direction of the characters "DE" on which the issuer name mark 61 is superimposed. A position 71*b* is the lowermost position in the vertical direction of the characters "DE". A position 71*c* is the central position in the vertical direction of the characters "DE".

As illustrated in FIG. 11, after the processing of S132, the OCR performance section 35*a* detects the uppermost, lowermost, and central positions in the vertical direction for all of the characters included in the image of the issuer name acquisition area 70 extracted in S131 (S133).

Next, based on each position detected in S132 and each position detected in S133, the OCR performance section 35*a* extracts characters in the same row as the characters on which the issuer name mark 61 is superimposed in the image of the issuer name acquisition area 70 extracted in S131 among all of the characters included in the image of the issuer name acquisition area 70 extracted in S131 (S134). The processing of S134 is processing for preventing misacquisition of characters not included in the same row as the characters on which the issuer name mark 61 is superimposed as a portion of the issuer name through later-described processing of S136.

After the processing of S134, the OCR performance section 35*a* extracts a character string including the characters on which the issuer name mark 61 is superimposed in the image of the issuer name acquisition area 70 extracted in S131 (S135). The character string is composed by the characters extracted in S134, and the distance between characters adjacent to each other in the character string is no greater than the specific distance. Here, the specific distance may be a distance corresponding to the width of the characters such as the distance of five of the characters on which the issuer name mark 61 is superimposed, or may be a fixed distance independent of the width of the characters, such as 1 cm. The processing of S135 is processing for preventing misacquisition of characters which are included in the same row as the characters on which the issuer name mark 61 is superimposed but are clearly not related to the issuer name as a portion of the issuer name through the later-described processing of S136.

After the processing of S135, the OCR performance section 35*a* acquires the character string extracted in S135 as an issuer name using the OCR software 34*b* (S136) and ends the issuer name acquisition processing illustrated in FIG. 11.

For example, the OCR performance section 35*a* can acquire "DEF COMPANY" as an issuer name from the issuer name acquisition area 70 illustrated in FIG. 12 through the issuer name acquisition processing illustrated in FIG. 11.

As illustrated in FIG. 9, after the issuer name acquisition processing of S102, the OCR performance section 35*a* determines the issuer name reading target area according to the position of the issuer name acquired in the issuer name acquisition processing (S103).

After the processing of S103, the OCR performance section 35*a* determines whether or not the issuer-recorded content mark 62 has been applied to the target form image (S104).

Upon determining in S104 that the issuer-recorded content mark 62 has been applied to the target form image, the OCR performance section 35*a* specifies the issuer-recorded content reading target area using the issuer-recorded content mark 62 (S105).

Next, the OCR performance section 35*a* specifies a font name of characters in the issuer-recorded content reading target area specified in S105 in the target form image (S106). That is, the OCR performance section 35*a* searches the font database 34*c* for the font name of the characters included in the issuer-recorded content reading target area specified in S105 in the target form image and specifies the font name.

Upon determining in S104 that the issuer-recorded content mark 62 has not been applied to the target form image or ending the processing of S106, the OCR performance section 35*a* determines whether or not an OCR reliability mark has been applied to the target form image (S107).

Upon determining in S107 that the OCR reliability mark 63 has been applied to the target form image, the OCR performance section 35*a* acquires "low" as the reliability of OCR processing on the form 50 issued by the issuer indicated by the issuer name acquired through the issuer name acquisition processing of S102 (S108).

Upon determining in S107 that the OCR reliability mark 63 has not been applied to the target form image or ending the processing of S108, the OCR information management section 35*b* reflects the performance results of the processing of S101 to S108 in the OCR information table 34*e* (S109). That is, when the issuer name acquired in the issuer name acquisition processing of S102 is not included in the OCR information table 34*e,* the OCR information management section 35*b* first registers the issuer name acquired in the issuer name acquisition processing of S102 to the OCR information table 34*e*. Here, when registering an issuer name to the OCR information table 34*e,* the OCR information management section 35*b* registers "high" to the OCR information table 34*e* as the reliability of OCR processing associated with the issuer name. Next, when acquisition of the reliability of OCR processing has been performed in S108, the OCR information management section 35*b* registers "low" as the reliability of OCR processing associated with the issuer name acquired in the issuer name acquisition processing of S102 by overwriting on the OCR information table 34*e*. Furthermore, the OCR information management section 35*b* registers the issuer name reading target area acquired in S103 as the issuer name reading target area associated with the issuer name acquired in the issuer name acquisition processing of S102 by overwriting on the OCR information table 34e. Also, when specification of the issuer-recorded content reading target area has been performed in S105, the OCR information management section 35b registers the issuer-recorded content reading target area specified in S105 as the issuer-recorded content reading target area associated with the issuer name acquired in the issuer name acquisition processing of S102 by overwriting on the OCR information table 34e. In addition, when specification of a font name has been performed in S106, the OCR information management section 35b registers the font name specified in S106 as the font name associated with the issuer name acquired in the issuer name acquisition processing of S102 by overwriting on the OCR information table 34e.

Upon ending the processing of S109, the OCR performance section 35a performs the processing of S101 illustrated in FIG. 9.

Next, the operation of the OCR system 10 is described in a case in which form data is saved in the form database 34d through OCR processing in a font of one type.

Figure 14A:
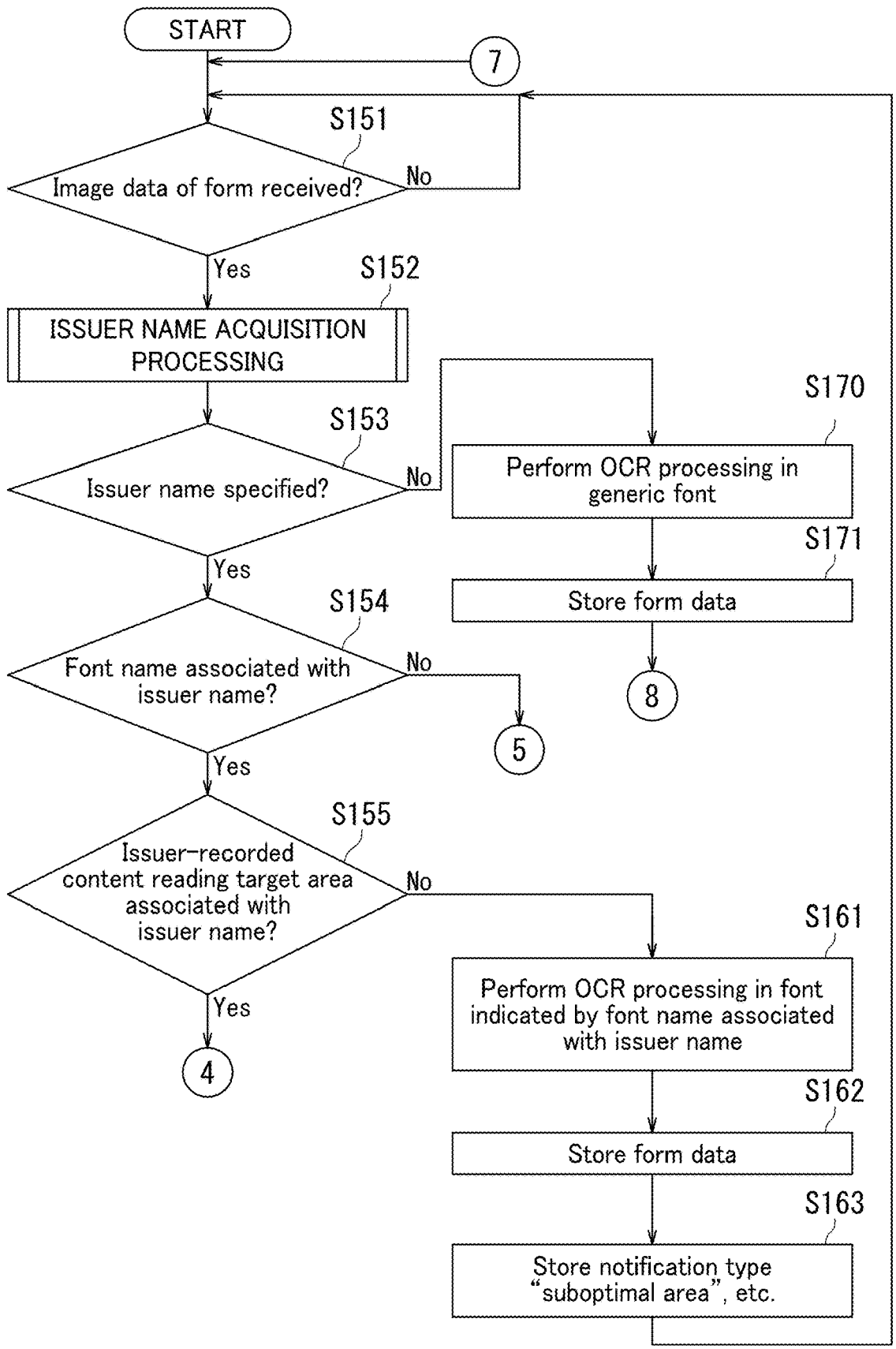
FIG. 14A is a flowchart of a portion of operation of the form data management system illustrated in FIG. 4 in a case in which form data is saved in the form database through OCR processing in a font of one type.
Figure 14B:
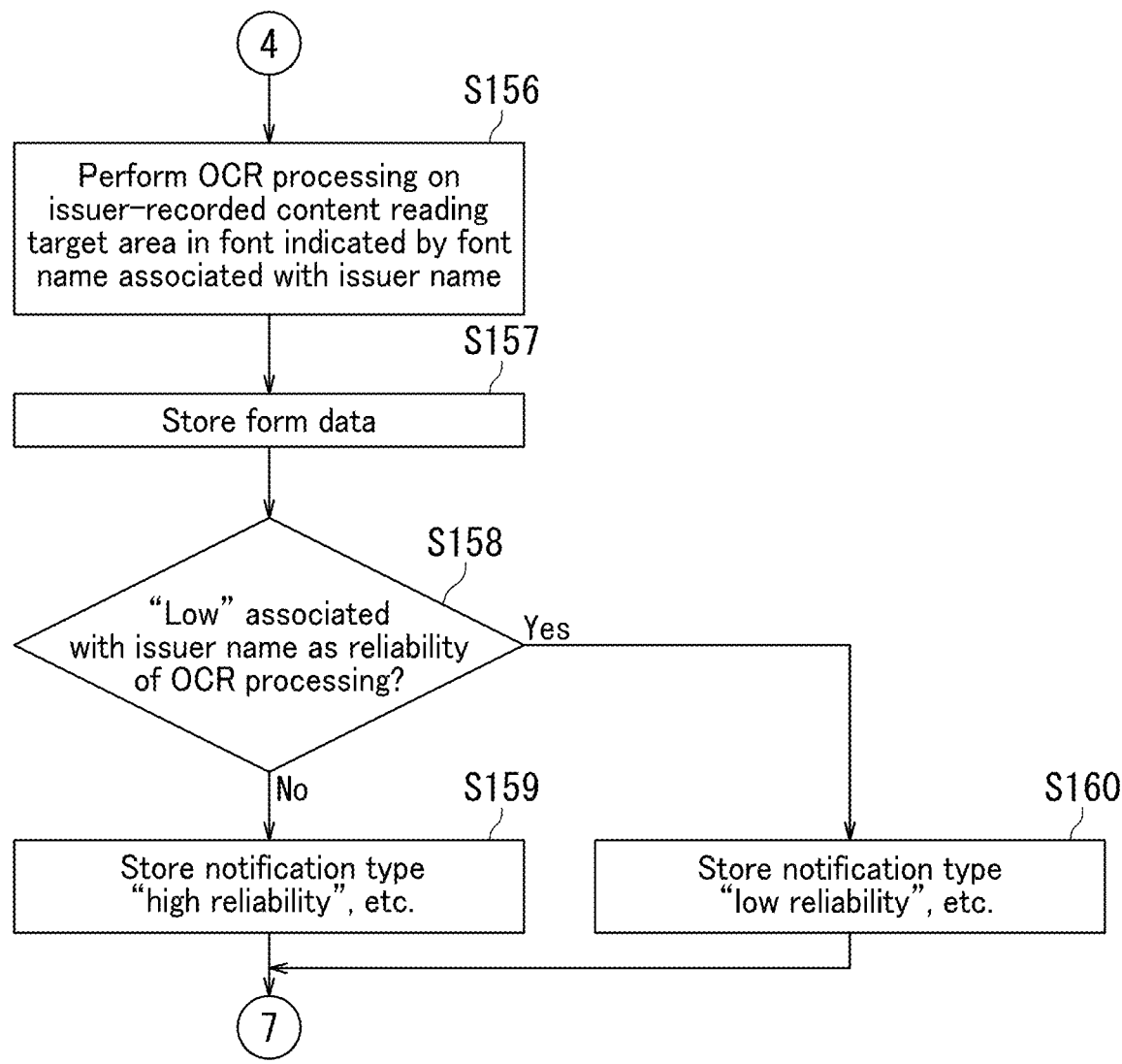
FIG. 14B is a flowchart of operation continuing from the operation illustrated in FIG. 14A.
Figure 15:
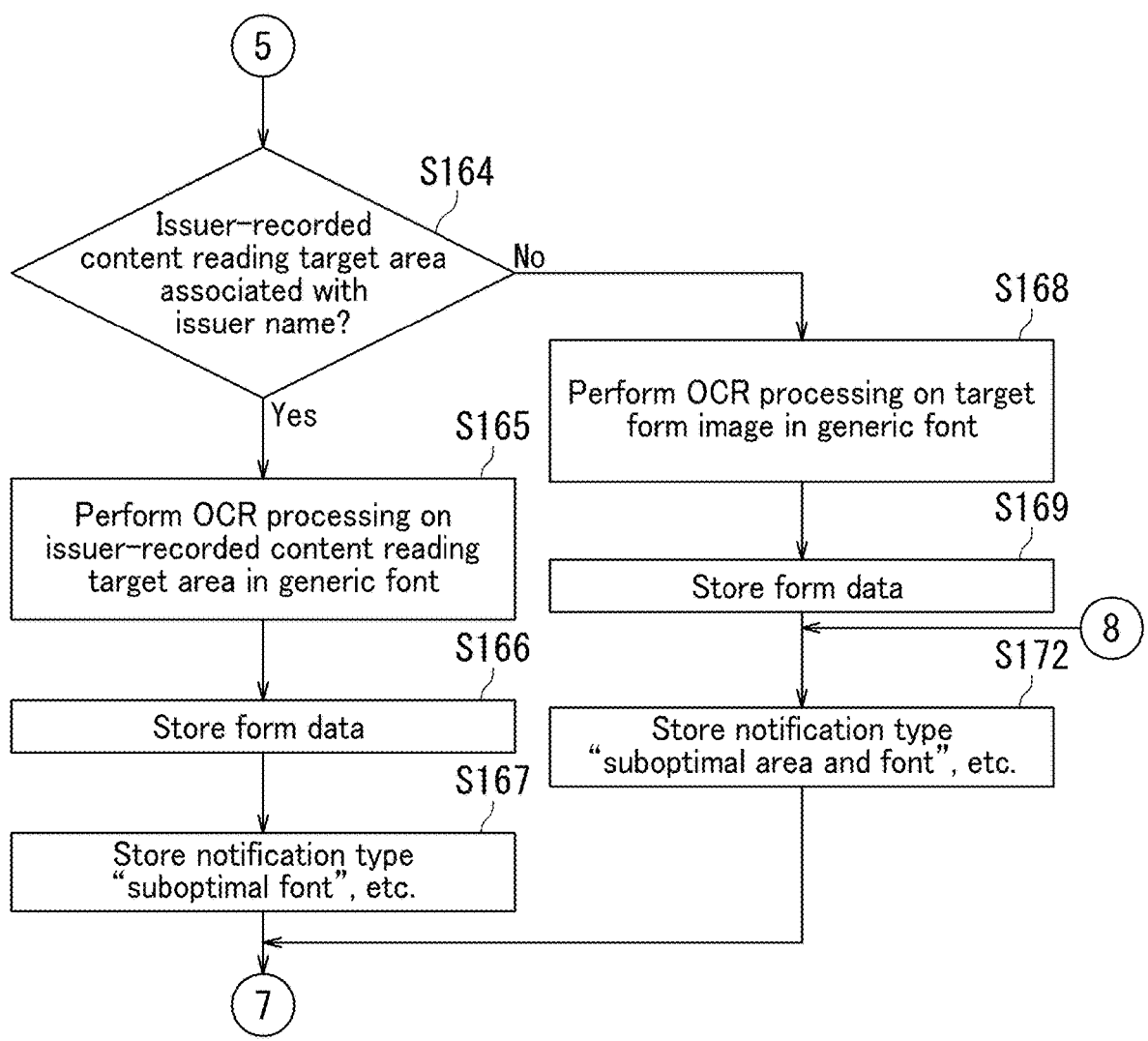
FIG. 15 is a flowchart of operation continuing from the operation illustrated in FIG. 14.

FIGS. 14A, 14B, and 15 are flowcharts of the operation of the form data management system 30 in a case in which form data is saved in the form database 34d through OCR processing in a font of one type.

As illustrated in FIGS. 14A, 14B, and 15, the OCR performance section 35a of the form data management system 30 determines whether or not image data of the form 50 has been received until determining that image data of the form 50 has been received (S151). For example, the image data of the form 50 may be generated as image data by reading the paper form 50 using the scanner 24 of the image forming apparatus 20 and sent from the image forming apparatus 20 to the form data management system 30. Alternatively, the image data of the form 50 may be generated in an unillustrated computer and sent from the unillustrated computer to the form data management system 30.

Upon determining in S151 that the image data of the form 50 has been received, the OCR performance section 35a performs issuer name specification processing to specify the issuer name of the form (referred to in the following as a "target form") indicated by the image data determined to be received in S151 (S152).

Figure 16A:
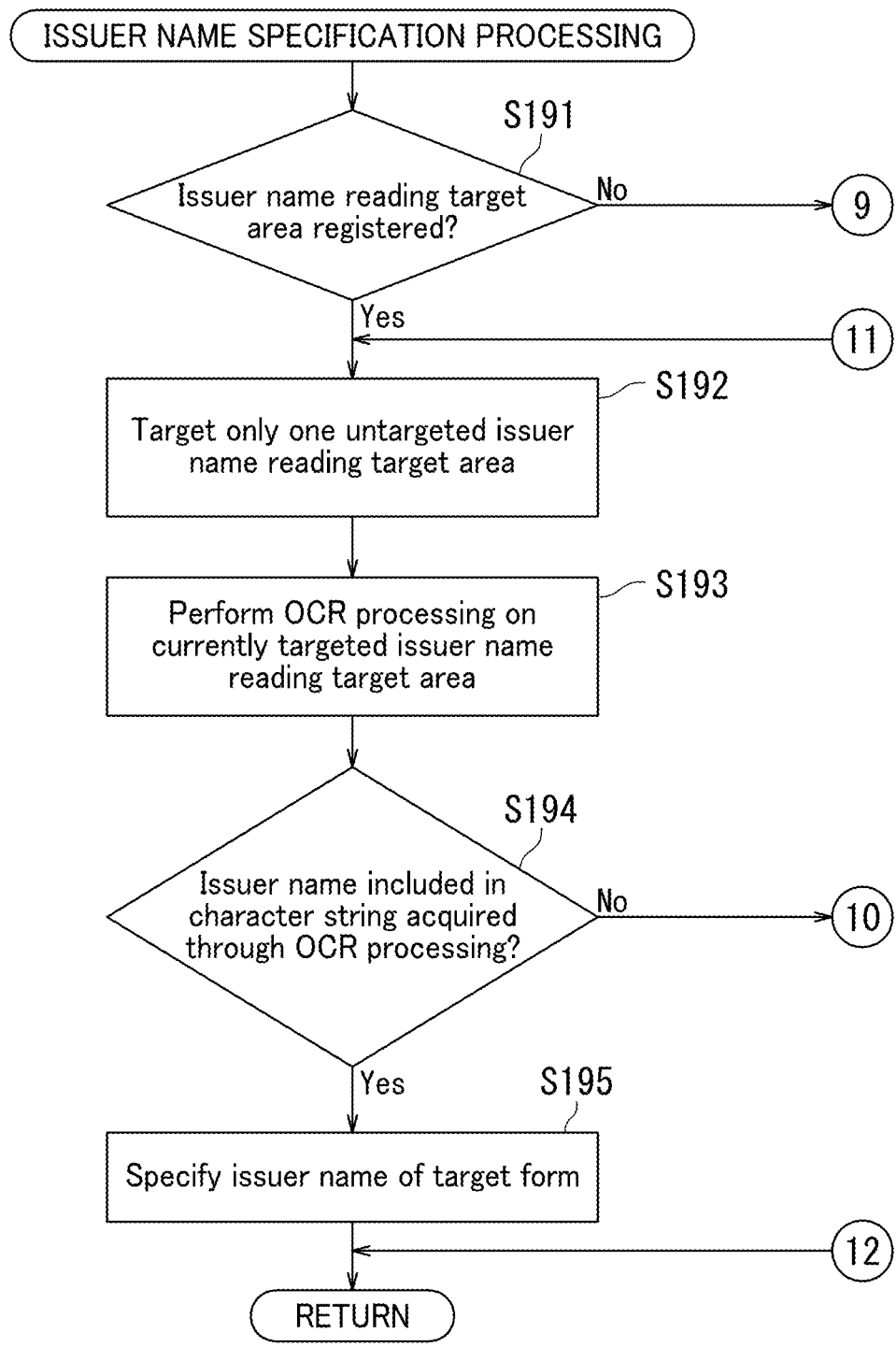
FIG. 16A is a flowchart of a portion of issuer name specification processing illustrated in FIG. 14A.
Figure 16B:
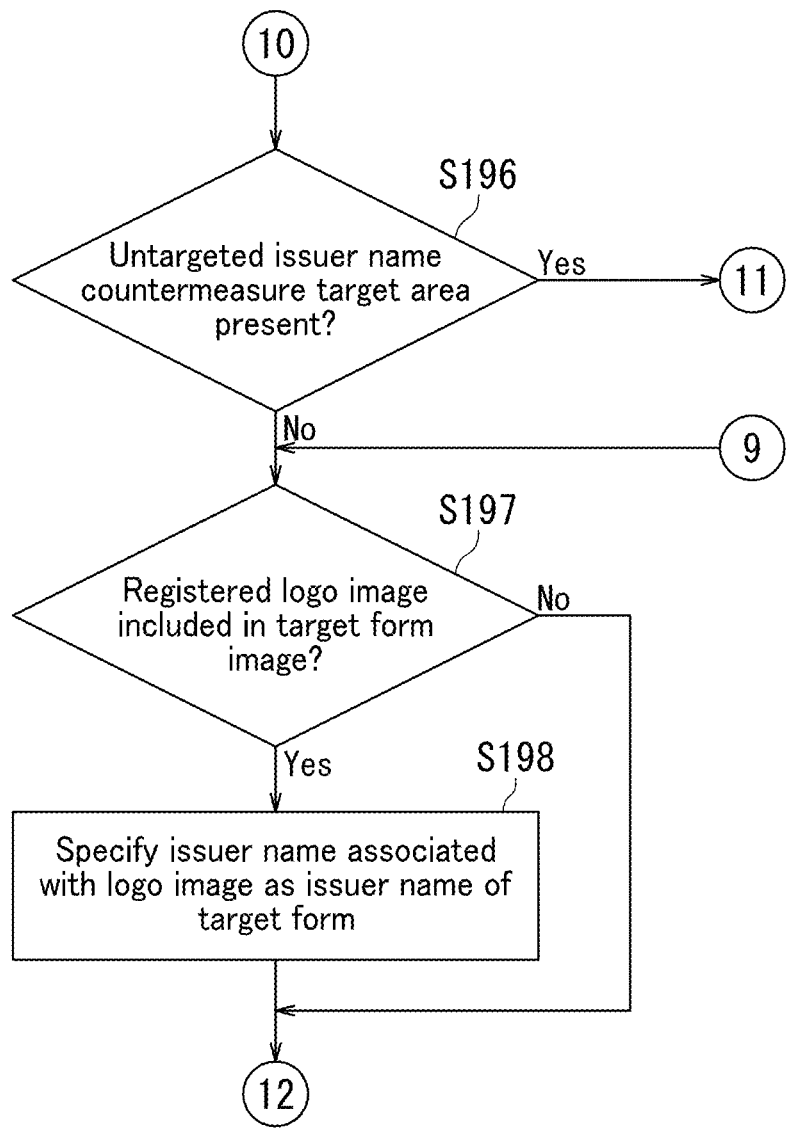
FIG. 16B is a flowchart of operation continuing from the operation illustrated in FIG. 16A.

FIG. 16A is a flowchart of a portion of the issuer name specification processing illustrated in FIG. 14A. FIG. 16B is a flowchart of operation continuing from the operation illustrated in FIG. 16B.

As illustrated in FIG. 16A, the OCR performance section 35a determines whether or not any issuer name reading target areas are registered to the OCR information table 34e (S191).

Upon determining in S191 that any issuer name reading target areas are registered to the OCR information table 34e, the OCR performance section 35a targets only one untargeted issuer name reading target area that is registered to the OCR information table 34e (S192).

Next, the OCR performance section 35a performs OCR processing using the OCR software 34b on an image indicated by the image data determined to be received in S151, that is, on the currently targeted issuer name reading target area in the target form image (S193).

Next, the OCR performance section 35a determines whether or not an issuer name associated with the currently targeted issuer name reading target area in the OCR information table 34e is included in the character string acquired through the OCR processing performed in S193 (S194).

Upon determining in S194 that an issuer name associated with the currently targeted issuer name reading target area in the OCR information table 34e is included in the character string acquired through the OCR processing performed in S193, the OCR performance section 35a specifies the issuer name associated with the currently targeted issuer name reading target area in the OCR information table 34e as the issuer name of the target form (S195) and ends the issuer name specification processing illustrated in FIG. 16A.

Upon determining in S194 that an issuer name associated with the currently targeted issuer name reading target area in the OCR information table 34e is not included in the character string acquired through the OCR processing performed in S193, the OCR performance section 35a determines whether or not any untargeted issuer name reading target areas that are registered to the OCR information table 34e are present as illustrated in FIG. 16B (S196).

Upon determining in S196 that an untargeted issuer name reading target area that is registered to the OCR information table 34e is present, the OCR performance section 35a performs the processing of S192.

Upon determining in S191 that no issuer name reading target area is registered to the OCR information table 34e or determining in S196 that no untargeted issuer name reading target areas that are registered to the OCR information table 34e are present, the OCR performance section 35a determines whether or not a logo image registered to the OCR information table 34e is included in the target form image through image matching processing (S197).

Upon determining in S197 that a logo image registered to the OCR information table 34e is included in the target form image, the OCR performance section 35a specifies the issuer name associated in the OCR information table 34e with the logo image determined in S197 to be included in the target form image as the issuer name of the target form (S198) and ends the issuer name specification processing illustrated in FIGS. 16A and 16B.

Upon determining in S197 that no logo image registered to the OCR information table 34e is not included in the target form image, the OCR performance section 35a ends the issuer name specification processing illustrated in FIGS. 16A and 16B.

As illustrated in FIG. 14A, upon ending the issuer name specification processing of S152, the OCR performance section 35a determines whether or not an issuer name has been specified in the issuer name specification processing of S152 (S153).

Upon determining in S153 that an issuer name has been specified in the issuer name specification processing of S152, the OCR performance section 35a determines whether or not a font name is associated in the OCR information table 34e with the issuer name specified in the issuer name specification processing of S152 (S154).

Upon determining in S154 that a font name is associated in the OCR information table 34e with the issuer name specified in the issuer name specification processing of S152, the OCR performance section 35a determines whether or not an issuer-recorded content reading target area is associated in the OCR information table 34e with the issuer name specified in the issuer name specification processing of S152 (S155).

As illustrated in FIGS. 14A and 14B, upon determining in S155 that an issuer-recorded content reading target area is associated in the OCR information table 34e with the issuer name specified in the issuer name specification processing of S152, the OCR performance section 35a performs OCR processing using the OCR software 34b on the issuer-recorded content reading target area in the target form image in the font indicated by the font name associated in the OCR information table 34e with the issuer name specified in the issuer name specification processing of S152 (S156).

Next, the OCR performance section 35a saves in the form database 34d the issuer name acquired in the issuer name specification processing of S152, the character data including the character string acquired through OCR processing performed in S156, and the form data included in the image data determined to be received in S151 (S157). Here, the OCR performance section 35a automatically assigns a form data ID to the form data saved in S157.

Next, the OCR performance section 35a determines whether or not "low" is associated in the OCR information table 34e with the issuer name acquired in the issuer name specification processing of S152 as the reliability of OCR processing (S158).

Upon determining in S158 that "low" is not associated in the OCR information table 34e with the issuer name acquired in the issuer name specification processing of S152 as the reliability of OCR processing, the OCR performance section 35a saves "high reliability" as a notification type, "uncorrected" as the correction status of the form data, the font name used in the OCR processing in S156, and the character data including the character string acquired through the OCR processing performed in S156 in the correction information database 34f in association with the form data ID of the form data saved in the form database 34d in S157 (S159) and performs the processing of S151.

Upon determining in S158 that "low" is associated in the OCR information table 34e with the issuer name acquired in the issuer name specification processing of S152 as the reliability of OCR processing, the OCR performance section 35a saves in the correction information database 34f "low reliability" as a notification type, "uncorrected" as the correction status of the form data, the font name used in the OCR processing in S156, and the character data including the character string acquired through the OCR processing performed in S156 in association with the form data ID of the form data saved in the form database 34d in S157 (S160) and performs the processing of S151.

Upon determining in S155 that no issuer-recorded content reading target area is associated in the OCR information table 34e with the issuer name specified in the issuer name specification processing of S152, the OCR performance section 35a performs OCR processing using the OCR software 34b on the target form image in the font indicated by the font name associated in the OCR information table 34e with the issuer name specified in the issuer name specification processing of S152 (S161).

Next, the OCR performance section 35a saves in the form database 34d the issuer name specified in the issuer name specification processing of S152, the character data including the character string acquired through the OCR processing performed in S161, and the form data including the image data determined to be received in S151 (S162). Here, the OCR performance section 35a automatically assigns a form data ID to the form data saved in S162.

Next, the OCR performance section 35a saves in the correction information database 34f "suboptimal area" as a notification type, "uncorrected" as the correction status of the form data, the font name used in the OCR processing in S161, and the character data including the character string acquired through the OCR processing performed in S161 in association with the form data ID of the form data saved in the form database 34d in S162 (S163), and performs the processing of S151.

As illustrated in FIGS. 14A and 15, upon determining in S154 that no font name is associated in the OCR information table 34e with the issuer name specified in the issuer name specification processing of S152, the OCR performance section 35a determines whether or not an issuer-recorded content reading target area is associated in the OCR information table 34e with the issuer name specified in the issuer name specification processing of S152 (S164).

Upon determining in S164 that an issuer-recorded content reading target area is associated in the OCR information table 34e with the issuer name specified in the issuer name specification processing of S152, the OCR performance section 35a performs OCR processing using the OCR software 34b on the issuer-recorded content reading target area of the target form image in a generic font (S165).

Next, the OCR performance section 35a saves in the form database 34d the issuer name specified in the issuer name specification processing of S152, the character data including the character string acquired through the OCR processing performed in S165, and the form data including the image data determined to be received in S151 (S166). Here, the OCR performance section 35a automatically assigns a form data ID to the form data saved in S166.

Next, the OCR performance section 35a saves in the correction information database 34f "suboptimal font" as a notification type, "uncorrected" as the correction status of the form data, the font name used in the OCR processing in S165, and the character data including the character string acquired through the OCR processing performed in S165 in association with the form data ID of the form data saved in the form database 34d in S166 (S167) and performs the processing of S151.

Upon determining in S164 that no issuer-recorded content reading target area is associated in the OCR information table 34e with the issuer name specified in the issuer name specification processing of S152, the OCR performance section 35a performs OCR processing using the OCR software 34b on the target form image in the generic font (S168).

Next, the OCR performance section 35a saves in the form database 34d character data including the issuer name specified in the issuer name specification processing of S152 and the character string acquired through the OCR processing performed in S168, and form data including the image data determined to be received in S151 (S169). Here, the OCR performance section 35a automatically assigns a form data ID to the form data saved in S169.

Upon determining in S153 that an issuer name has not been specified in the issuer name specification processing of S152, the OCR performance section 35a performs OCR processing using the OCR software 34b on the target form image in the generic font (S170).

Next, the OCR performance section 35a saves in the form database 34d the character data including the character string acquired through the OCR processing performed in S170 and the form data including the image data determined to be received in S151 (S171). Here, the OCR performance section 35a automatically assigns a form data ID to the form data saved in S171.

After the processing of S169 or S171, the OCR performance section 35a saves in the correction information database 34f "suboptimal area and font" as a notification type, "uncorrected" as the correction status of the form data, the font name used in the OCR processing in S168 or S170, and the character data including the character string acquired through the OCR processing performed in S168 or S170 in association with the form data ID of the form data saved in the form database 34*d* in S169 or S171 (S172), and performs the processing of S151.

Next, the operation of the OCR system 10 is described in a case in which form data is confirmed.

Figure 17:
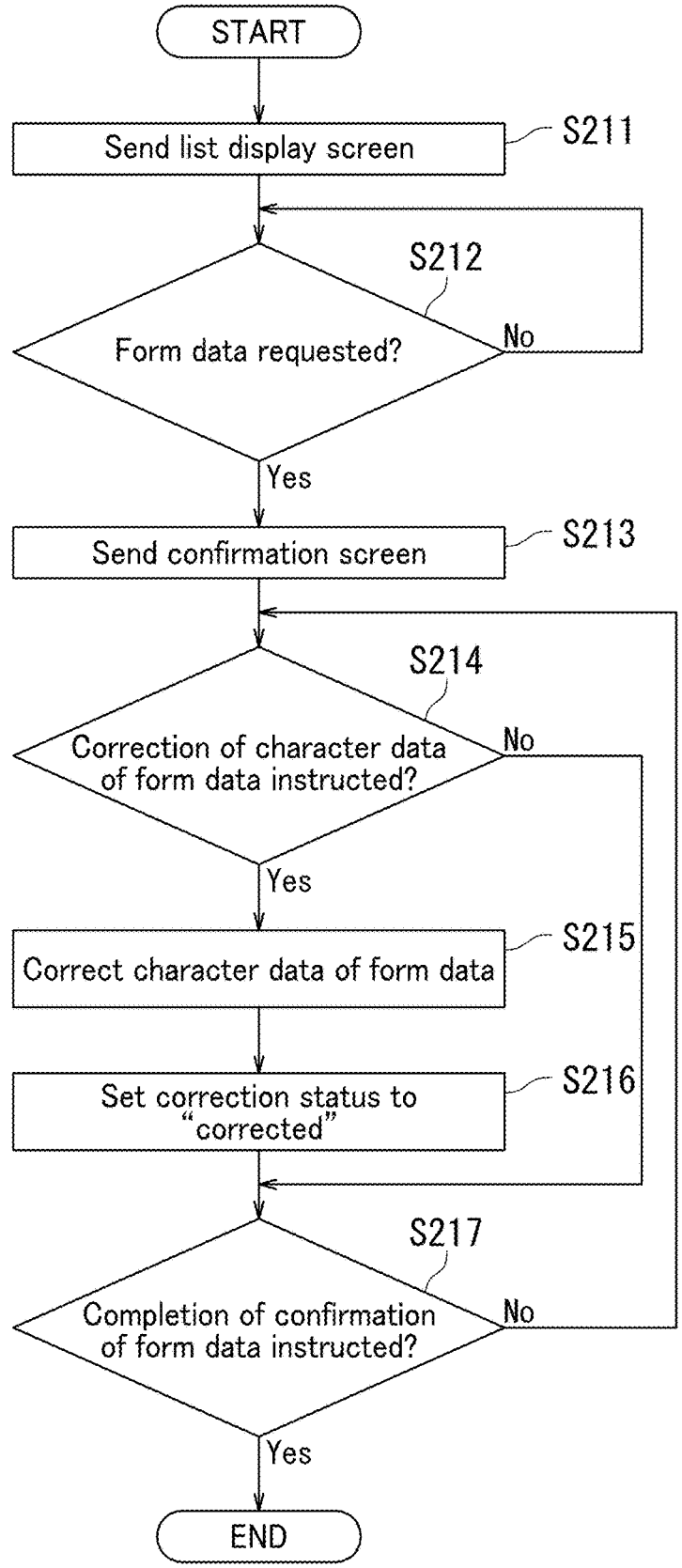
FIG. 17 is a flowchart of operation of the form data management system illustrated in FIG. 4 in a case in which form data is confirmed.

FIG. 17 is a flowchart of the operation of the form data management system 30 in a case in which form data is confirmed.

The data confirmer can instruct the user terminal 40 to display a list of form data managed by the form data management system 30 through the operation section 41 of the user terminal 40. Upon being instructed to display the list of the form data managed by the form data management system 30, the controller 45 of the user terminal 40 requests the form data management system 30 to display the list of the form data managed by the form data management system 30.

Upon the user terminal 40 requesting to display the list of the form data managed by the form data management system 30, the correction receiving section 35*c* of the form data management system 30 performs the operation illustrated in FIG. 17.

As illustrated in FIG. 17, the correction receiving section 35*c* sends a list display screen exhibiting a list of form data included in the form database 34*d* to the user terminal 40 (S211). Here, the correction receiving section 35*c* adds to the list display screen a correction status included in the correction information database 34*f*.

Upon receiving the list display screen sent in S211, the controller 45 of the user terminal 40 displays the received list display screen on the display section 42. Accordingly, the data confirmer can select through the operation section 41 the form data which the data confirmer wishes to confirm from the list display screen displayed on the display section 42. For example, the data confirmer can select any one piece of form data for which the correction status is "uncorrected" in the list display screen displayed on the display section 42 as the form data which the data confirmer wishes to confirm. Upon form data being selected from the list display screen, the controller 45 of the user terminal 40 requests the selected form data from the form data management system 30.

After the processing of S211, the correction receiving section 35*c* of the form data management system 30 determines whether or not the user terminal 40 has requested form data until the user terminal 40 has requested form data (S212).

Upon determining in S212 that the user terminal 40 has requested form data, the correction receiving section 35*c* sends to the user terminal 40 a confirmation screen of the form data (referred to in the following as "target form data") determined in S212 to be requested by the user terminal 40 (S213). Here, the correction receiving section 35*c* adds to the confirmation screen an image indicated by image data of the target form data included in the form database 34*d*, a character string indicated by the character data of the target form data included in the form database 34*d*, the font name associated with the target form data in the correction information database 34*f*, a character string indicated by the character data associated with the target form data in the correction information database 34*f*, and a notification corresponding to the notification type associated with the target form data in the correction information database 34*f*. The notification corresponding to the notification type is for example a message stating "Please confirm." when the notification type is "high reliability". Also, the notification corresponding to the notification type is for example a message stating "This form has had several correction errors in the past. Please thoroughly confirm all items." when the notification type is "low reliability". Furthermore, the notification corresponding to the notification type is for example a message stating "OCR processing has been performed on a suboptimal area. Please thoroughly confirm all items." when the notification type is "suboptimal area". In addition, the notification corresponding to the notification type is "OCR processing has been performed in a suboptimal font. Please thoroughly confirm all items." when the notification type is "suboptimal font". Also, the notification corresponding to the notification type is for example a message stating "OCR processing has been performed on a suboptimal area in a suboptimal font. Please thoroughly confirm all items." when the notification type is "suboptimal area and font".

Upon receiving the confirmation screen sent in S213, the controller 45 of the user terminal 40 displays the received confirmation screen on the display section 42. Accordingly, the data confirmer can confirm whether or not the character string indicated by the character data of the form data matches the character string included in the image indicated by the image data of the form data in the confirmation screen displayed on the display section 42. The data confirmer can then instruct correction of the character data of the form data from the confirmation screen through the operation section 41 for example when the character string indicated by the character data of the form data does not match the character string included in the image indicated by the image data of the form data. Upon correction of the character data of the form data being instructed, the controller 45 of the user terminal 40 notifies the form data management system 30 of the instructed correction content. Furthermore, the data confirmer can instruct the completion of confirmation of the form data from the confirmation screen through the operation section 41. Upon completion of the confirmation of the form data being instructed, the controller 45 of the user terminal 40 notifies the form data management system 30 of the completion of the confirmation of the form data.

After the processing of S213, the correction receiving section 35*c* of the form data management system 30 determines whether or not correction of the character data of the form data has been instructed from the user terminal 40 (S214).

Upon determining in S214 that the user terminal 40 has instructed a correction of the character data of the form data, the correction receiving section 35*c* corrects the character data of the target form data in the form database 34*d* according to the content of the instruction from the user terminal 40 (S215) and then sets the correction status associated with the target form data in the correction information database 34*f* to "corrected" (S216).

Upon determining in S214 that the user terminal 40 has not instructed a correction of the character data of the form data or ending the processing of S216, the correction receiving section 35*c* determines whether or not the user terminal 40 has instructed completion of the confirmation of the form data (S217).

Upon determining in S217 that the user terminal 40 has not instructed completion of the confirmation of the form data, the correction receiving section 35*c* performs the processing of S214.

Upon determining in S217 that the user terminal 40 has instructed completion of the confirmation of the form data, the correction receiving section 35*c* ends the operation illustrated in FIG. 17.

As described above, the OCR system 10 performs OCR processing on the issuer-recorded content reading target area of the form 50 in the font of the font name associated in the OCR information table 34e with the issuer name of the issuer of the form 50 (S156). Accordingly, possibility can be increased that the font name (font type) of the font of the characters in the issuer-recorded content reading target area in the form 50 is the same as the font name (font type) of the font used in OCR processing on the issuer-recorded content reading target area. As a result, character recognition accuracy in OCR processing can be improved. When the character recognition accuracy in OCR processing can be improved, the OCR system 10 can decrease the correction amount by the data confirmer on the character data acquired from the form 50 through OCR processing and can shorten the work time of correction of character data by the data confirmer.

Note that for example, in a case in which character recognition accuracy in OCR processing corresponding to a font is originally poor, or in a case in which character recognition accuracy by OCR processing is poor due to a printability problem of an image forming apparatus which has printed the form 50, there is the possibility that character recognition accuracy in OCR processing will be poor even if the font name of the font of the characters in the issuer-recorded content reading target area in the form 50 is the same as the font name of the font used in the OCR processing on the issuer-recorded content reading target area. The OCR system 10 performs a notification corresponding to the reliability of OCR processing associated in the OCR information table 34e with the issuer name of the issuer of the form 50 when the character data of the form 50 is corrected (S213). Accordingly, correction errors of the character data by the data confirmer can be reduced.

The OCR system 10 acquires the issuer name (identification information) of the issuer of the form 50 through OCR processing on the form 50 (S152). Then, OCR processing is performed on the issuer-recorded content reading target area of the form 50 in the font of the font name associated in the OCR information table 34e with the acquired issuer name (S156). Accordingly, convenience can be improved.

By performing OCR processing on a marked text, the OCR system 10 specifies the font name (font type) of the font of the characters in the issuer-recorded content reading target area specified by the issuer-recorded content mark in the marked text (S106). Then, the OCR system 10 adds the specified font name (font type) to the OCR information table 34e (S109). Accordingly, registration of the font name of the font in the OCR information table 34e can be simplified.

By performing OCR processing on the marked text, the OCR system 10 acquires the issuer name of the issuer specified by the issuer name mark in the marked text (S102). The OCR system 10 then adds the acquired issuer name to the OCR information table 34e (S109). Accordingly, registration of the issuer name of an issuer to the OCR information table 34e can be simplified.

When the character data of the form 50 is corrected, the OCR system 10 performs a notification corresponding to the reliability of the OCR processing associated in the OCR information table 34e with the issuer name of the issuer of the form 50 (S213). Accordingly, the burden of correction work for the character data acquired from the form 50 through OCR processing can be reduced.

By performing OCR processing on the marked text, the OCR system 10 acquires the reliability of the OCR processing indicated by the OCR reliability mark in the marked text (S108). The OCR system 10 then adds the acquired reliability to the OCR information table 34e (S109). Accordingly, registration of the reliability of OCR processing to the OCR information table 34e can be simplified.

The OCR system 10 acquires the issuer name of the issuer of the form 50 through OCR processing on the form 50 (S152). Then, the OCR system 10 performs the notification corresponding to the reliability of OCR processing associated in the OCR information table 34e with the acquired issuer name when the character data of the form 50 is corrected (S213). Accordingly, convenience can be improved.

By performing OCR processing on the marked text, the OCR system 10 acquires the issuer name of the issuer specified by the issuer name mark 61 (specification information mark) in the marked text (S102). The OCR system 10 then adds the acquired issuer name to the OCR information table 34e (S109). Accordingly, registration of the issuer name of the issuer to the OCR information table 34e can be simplified.

When performing OCR processing on the marked text, the OCR system 10 acquires a character string in which the internal distance between mutually adjacent characters is no greater than a specific distance as the issuer name (S134 to S136). The character string herein is composed by at least a portion of characters in the same row as the characters on which the issuer name mark 61 is superimposed and includes the characters on which the issuer name mark 61 is superimposed. Accordingly, the possibility of appropriately acquiring the issuer name can be increased even in a case in which the issuer name mark 61 is not superimposed on at least one character of the character string desired by the user, that is, of the issuer name.

The OCR system 10 can increase the possibility of appropriately acquiring the issuer name even in a case in which application of the issuer name mark 61 to the issuer name in the form 50 is incomplete. Accordingly, the possibility of registering an erroneous issuer name to the OCR information table 34e can be reduced. As a result, the OCR system 10 can reduce the necessity for the user to appropriately reapply the issuer name mark 61 to the form 50 and reread the form 50 to which the issuer name mark 61 has been appropriately reapplied using the scanner of an image forming apparatus.

The OCR system 10 performs a notification corresponding to the reliability of the OCR processing associated in the OCR information table 34e with the issuer name of the issuer of the form 50 when the character data of the form 50 is corrected (S213). Accordingly, the burden of correction work for the character data acquired from the form 50 through OCR processing can be reduced.

Second Embodiment

First, a configuration of an OCR system is described according to a second embodiment of the present invention.

The configuration of the OCR system according to the present embodiment is the same as the configuration of the OCR system 10 according to the first embodiment (refer to FIG. 1) except for the configuration described in the following. Of the configuration of the OCR system according to the present embodiment, configuration that is the same as the configuration of the OCR system 10 features the same reference signs as the configuration of the OCR system 10 and detailed description thereof is omitted.

The form data management system 30 of the OCR system according to the present embodiment stores a correction information database 334f (refer to FIG. 18) in the storage 34 instead of the correction information database 34f (refer to FIG. 7).

FIG. 18 is a diagram illustrating an example of the correction information database 334f stored in the form data management system 30 of the OCR system according to the present embodiment.

In the correction information database 334f illustrated in FIG. 18, a font name of a first font used in OCR processing, character data generated through OCR processing in the first font, a font name of a second font used in OCR processing, and character data generated through OCR processing in the second font are associated with the form data ID, the correction status of the form data, and the notification type instead of a font name of a font used in OCR processing and character data generated through OCR processing in the font indicated by the font name. For example, in FIG. 18, a form data ID "D001", a correction status "uncorrected" of the form data, a notification type "low reliability", a font name "Arial" of the first font used in OCR processing, character data "D001a.xlsx" "generated through OCR processing in the first font, a font name "Calibri" of the second font used in OCR processing, and character data "D001b.xlsx" generated through OCR processing in the second font are associated with one another.

Next, the operation of the OCR system is described according to the present embodiment.

The operation of the OCR system according to the present embodiment is the same as the operation of the OCR system 10 according to the first embodiment (refer to FIG. 1) except for the operation described in the following. Of the operation of the OCR system according to the present embodiment, detailed description of operation which is the same as the operation of the OCR system 10 is omitted.

First, the operation of the OCR system according to the present embodiment is described in a case in which form data is saved in the form database 34d through OCR processing in fonts of two types.

Figure 19A:
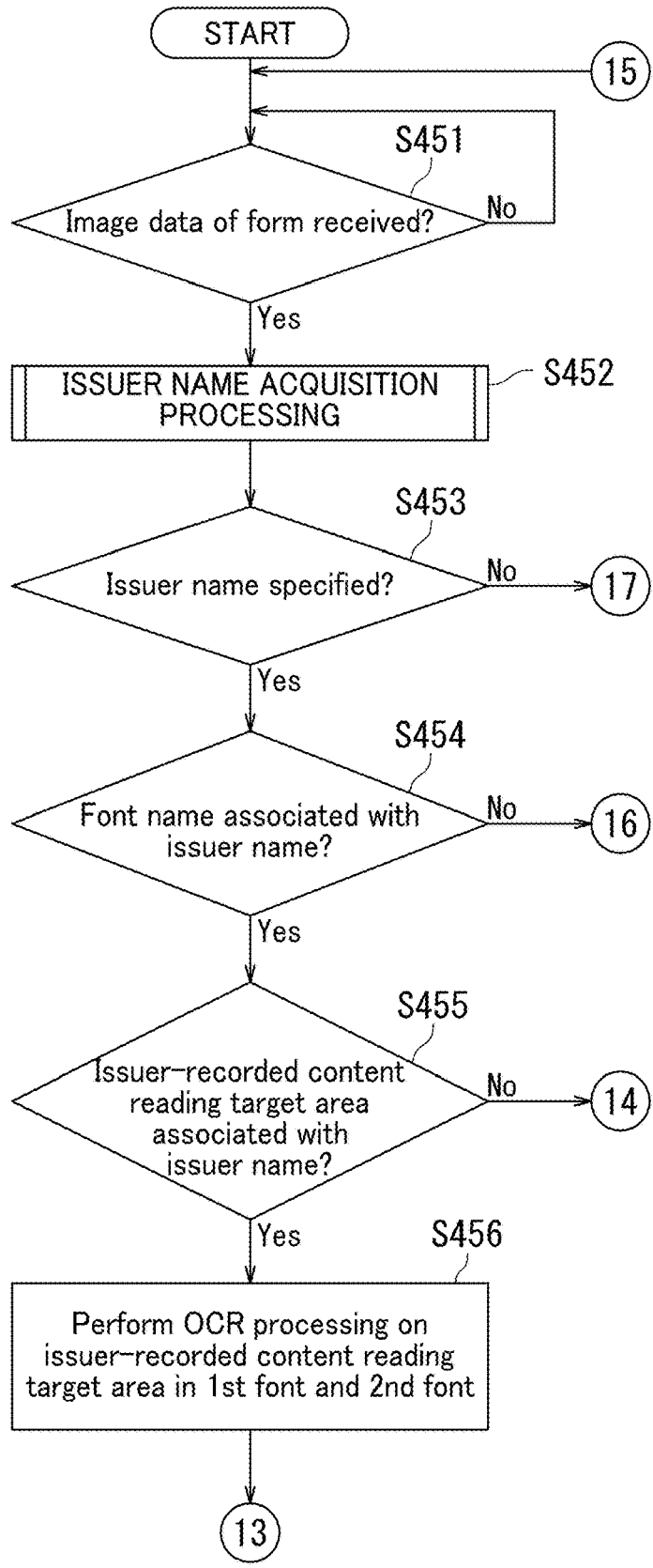
FIG. 19A is a flowchart of a portion of operation of the form data management system of the OCR system according to the second embodiment of the present invention in a case in which form data is saved in a form database through OCR processing in fonts of two types.
Figure 19B:
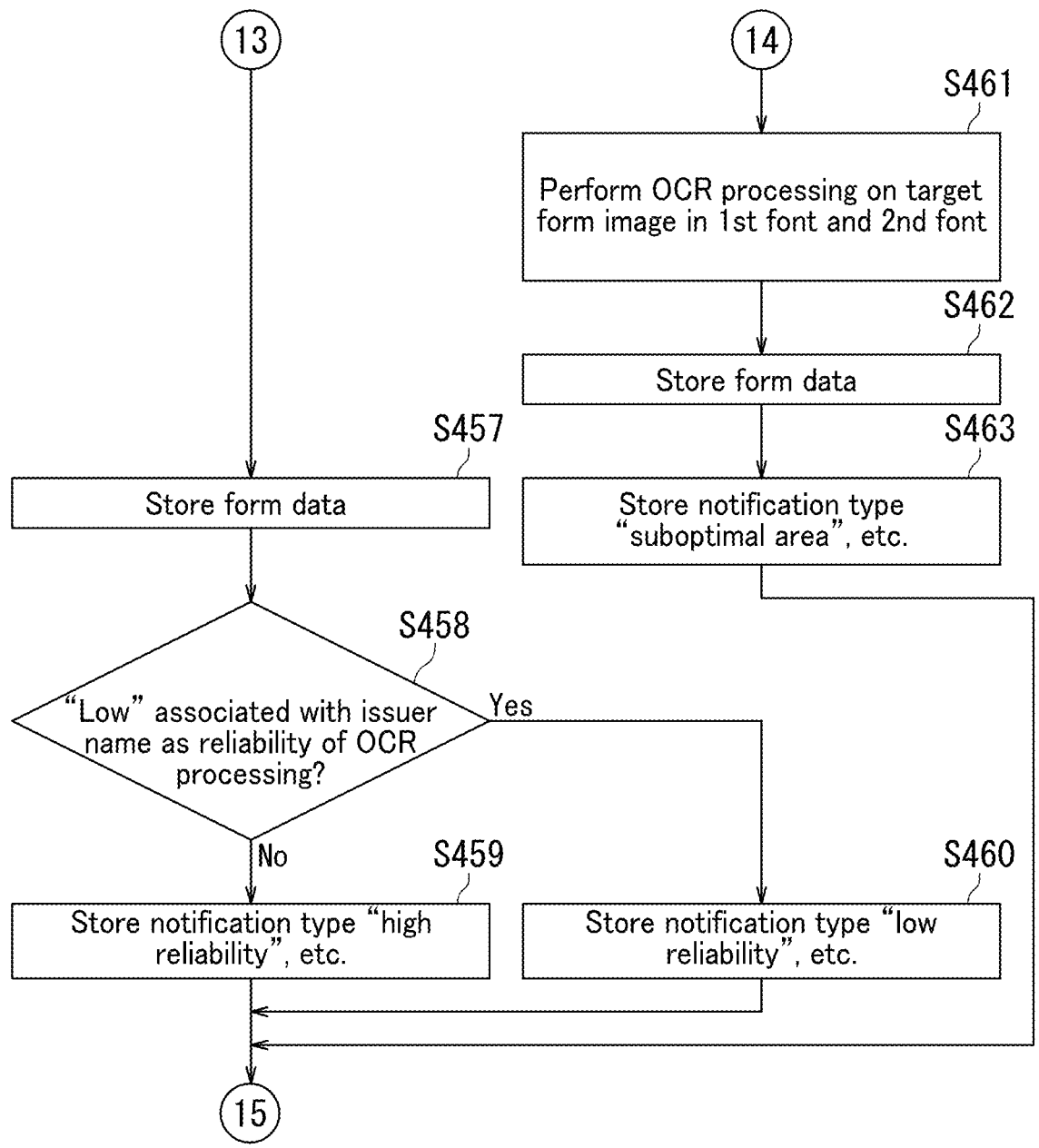
FIG. 19B is a flowchart of operation continuing from the operation illustrated in FIG. 19A.
Figure 20:
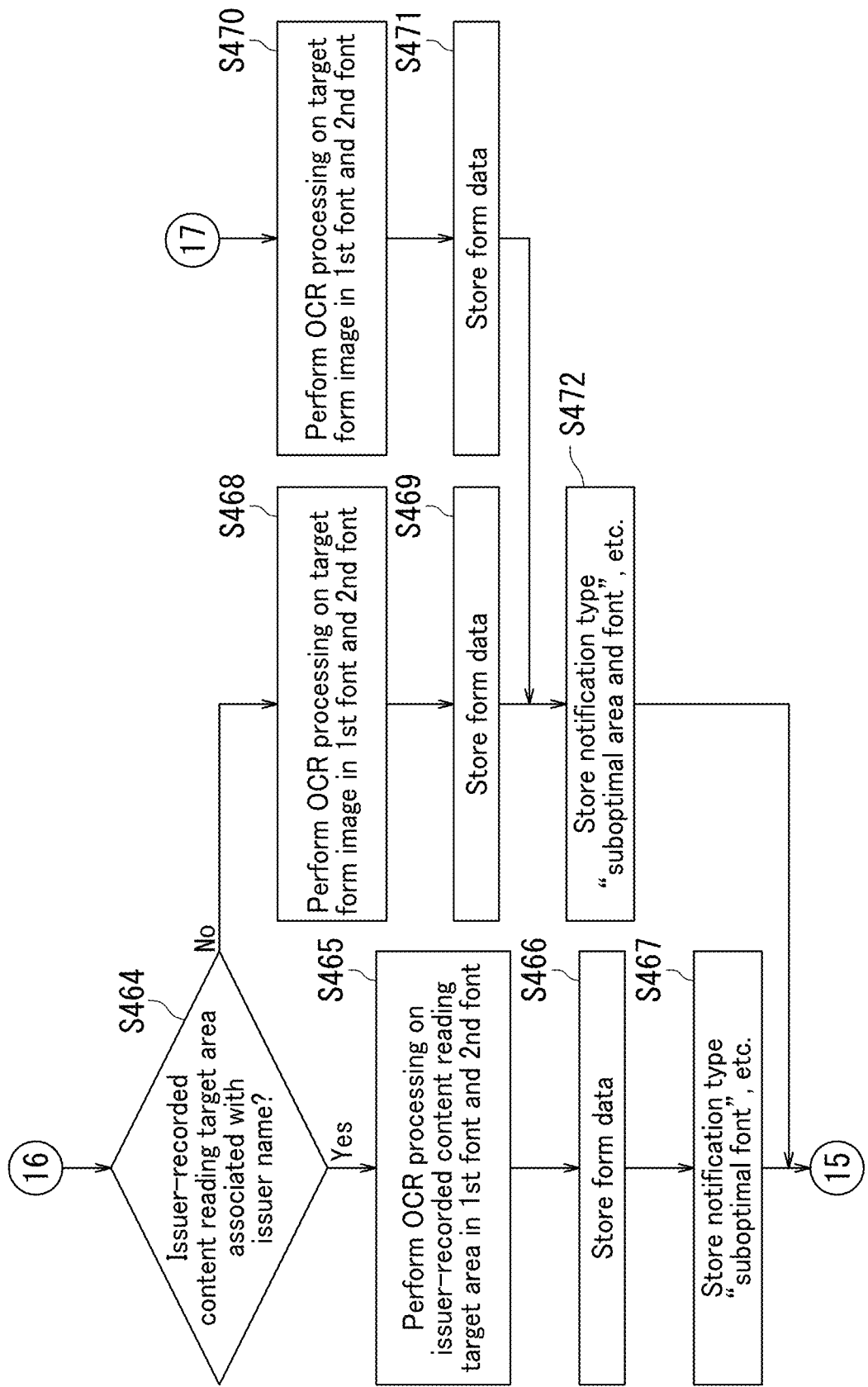
FIG. 20 is a flowchart of operation continuing from the operation illustrated in FIG. 19B.

FIGS. 19A, 19B, and 20 are flowcharts of the operation of the form data management system 30 in a case in which form data is saved in the form database 34d through OCR processing in fonts of two types.

As illustrated in FIGS. 19A, 19B, and 20, the OCR performance section 35a of the form data management system 30 performs processing of S451 to S455, which is the same as the processing of S151 to S155 (refer to FIG. 14A).

Upon determining in S455 that an issuer-recorded content reading target area is associated in the OCR information table 34e with the issuer name specified in the issuer name specification processing of S452, the OCR performance section 35a performs OCR processing using the OCR software 34b on the issuer-recorded reading target area in the target form image in a first font and a second font (S456). Here, the first font is the font indicated by the font name associated in the OCR information table 34e with the issuer name specified in the issuer name specification processing of S452 and the second font is a generic font which differs from the first font.

Next, the OCR performance section 35a saves in the form database 34d the issuer name specified in the issuer name specification processing of S452, character data including a character string acquired through the OCR processing in the first font performed in S456, and form data including the image data determined to be received in S451 (S457). Here, the OCR performance section 35a automatically assigns a form data ID to the form data saved in S457.

Next, the OCR performance section 35a performs processing of S458, which is the same as the processing of S158 (refer to FIG. 14).

Upon determining in S458 that "low" is not associated as the reliability of OCR processing in the OCR information table 34e with the issuer name specified in the issuer name specification processing of S452, the OCR performance section 35a saves in the correction information database 334f "high reliability" as a notification type, "uncorrected" as the correction status of the form data, the font name used in the OCR processing in the first font in S456, character data including the character string acquired through the OCR processing in the first font performed in S456, the font name used in the OCR processing in the second font in S456, and character data including the character string acquired through OCR processing in the second font performed in S456 in association with the form data ID of the form data saved in the form database 34d in S457 (S459) and performs the processing of S451.

Upon determining in S458 that "low" is associated as the reliability of OCR processing in the OCR information table 34e with the issuer name specified in the issuer name specification processing of S452, the OCR performance section 35a saves in the correction information database 334f "low reliability" as a notification type, "uncorrected" as the correction status of the form data, the font name used in the OCR processing in the first font in S456, character data including the character string acquired through the OCR processing in the first font performed in S456, the font name used in the OCR processing in the second font in S456, and character data including the character string acquired through the OCR processing in the second font performed in S456 in association with the form data ID of the form data saved in the form database 34d in S457 (S460) and performs the processing of S451.

Upon determining in S455 that no issuer-recorded content reading target area is associated in the OCR information table 34e with the issuer name specified in the issuer name specification processing of S452, the OCR performance section 35a performs OCR processing using the OCR software 34b on the target form image in a first font and a second font (S461). Here, the first font is the font indicated by the font name associated in the OCR information table 34e with the issuer name specified in the issuer name specification processing of S452, and the second font is a generic font which differs from the first font.

Next, the OCR performance section 35a saves in the form database 34d the issuer name specified in the issuer name specification processing of S452, character data including the character string acquired through the OCR processing in the first font performed in S461, and form data including the image data determined to be received in S451 (S462). Here, the OCR performance section 35a automatically assigns a form data ID to the form data saved in S462.

Next, the OCR performance section 35a saves in the correction information database 334f "suboptimal area" as a notification type, "uncorrected" as the correction status of the form data, the font name used in the OCR processing in the first font in S461, character data including the character string acquired through the OCR processing in the first font performed in S461, the font name used in the OCR processing in the second font in S461, and character data including the character string acquired through the OCR processing in the second font performed in S461 in association with the form data ID of the form data saved in the form database 34d in S462 (S463) and performs the processing of S451.

Upon determining in S454 that no font name is associated in the OCR information table 34e with the issuer name specified in the issuer name specification processing of S452, the OCR performance section 35a performs the processing of S464 which is the same as the processing of S164 (refer to FIG. 15).

Upon determining in S464 that an issuer-recorded content reading target area is associated in the OCR information table 34e with the issuer name specified in the issuer name specification processing of S452, the OCR performance section 35a performs OCR processing using the OCR software 34b on the issuer-recorded content reading target area in the target form image in a first font and a second font (S465). Here, the first font is a generic font, and the second font is a generic font which differs from the first font.

Next, the OCR performance section 35a saves in the form database 34d character data including the issuer name specified in the issuer name specification processing of S452 and the character string acquired through the OCR processing in the first font performed in S465, and form data including the image data determined to be received in S451 (S466). Here, the OCR performance section 35a automatically assigns a form data ID to the form data saved in S466.

Next, the OCR performance section 35a saves in the correction information database 334f "suboptimal font" as a notification type, "uncorrected" as the correction status of the form data, the font name used in the OCR processing in the first font in S465, character data including the character string acquired through the OCR processing in the first font performed in S465, the font name used in the OCR processing in the second font in S465, and character data including the character string acquired through OCR processing in the second font performed in S465 in association with the form data ID of the form data saved in the form database 34d in S466 (S467) and performs the processing of S451.

Upon determining in S464 that no issuer-recorded content reading target area is associated in the OCR information table 34e with the issuer name specified in the issuer name specification processing of S452, the OCR performance section 35a performs OCR processing using the OCR software 34b on the target form image in a first font and a second font (S468). Here, the first font is a generic font, and the second font is a generic font which differs from the first font.

Next, the OCR performance section 35a saves in the form database 34d the issuer name specified in the issuer name specification processing of S452, character data including the character string acquired through the OCR processing in the first font performed in S468, and form data including the image data determined to be received in S451 (S469). Here, the OCR performance section 35a automatically assigns a form data ID to the form data saved in S469.

Upon determining in S453 that an issuer name has not been specified in the issuer name specification processing of S452, the OCR performance section 35a performs OCR processing using the OCR software 34b on the target form image in a first font and a second font (S470). Here, the first font is a generic font, and the second font is a generic font which differs from the first font.

Next, the OCR performance section 35a saves in the form database 34d character data including the character string acquired through the OCR processing in the first font performed in S470 and form data including the image data determined to be received in S451 (S471). Here, the OCR performance section 35a automatically assigns a form data ID to the form data saved in S471.

After the processing of S469 or S471, the OCR performance section 35a saves in the correction information database 334f "suboptimal area and font" as a notification type, "uncorrected" as the correction status of the form data, the font name used in the OCR processing in the first font in S468 or S470, character data including the character string acquired through the OCR processing in the first font performed in S468 or S470, the font name used in the OCR processing in the second font in S468 or S470, and character data including the character string acquired through the OCR processing in the second font performed in S468 or S470 in association with the form data ID of the form data saved in the form database 34d in S469 or S471 (S472) and performs the processing of S451.

Next, the operation of the OCR system according to the present embodiment is described in a case in which the form data is confirmed.

Figure 21:
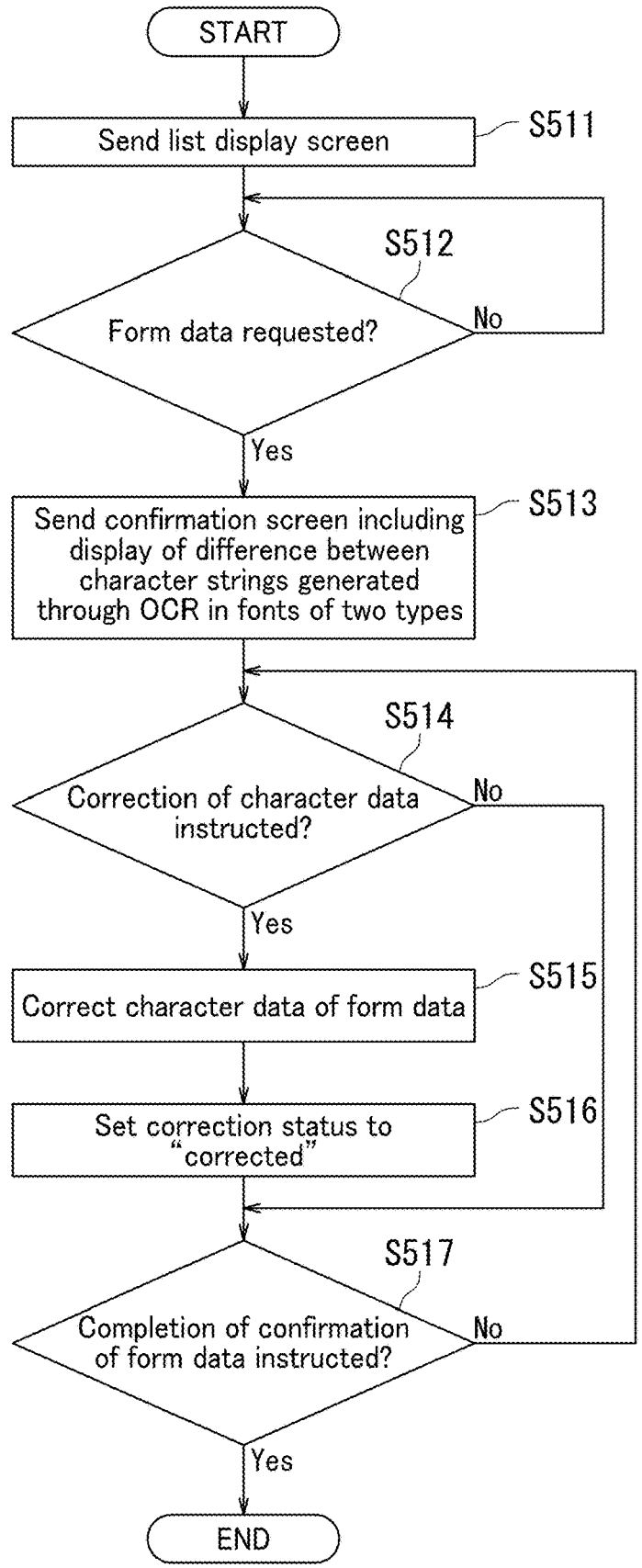
FIG. 21 is a flowchart of operation of the form data management system of the OCR system according to the second embodiment of the present invention in a case in which form data is confirmed.

FIG. 21 is a flowchart of the operation of the form data management system 30 in a case in which the form data is confirmed.

Upon the user terminal 40 requesting to display a list of form data managed by the form data management system 30, the correction receiving section 35c of the form data management system 30 performs the operation illustrated in FIG. 21.

As illustrated in FIG. 21, the correction receiving section 35c performs processing of S511 and S512 which is the same as the processing of S211 and S212 (refer to FIG. 17).

Upon determining in S512 that the user terminal 40 has requested form data, the correction receiving section 35c sends a confirmation screen of the form data determined in S512 to be requested by the user terminal 40, that is, the target form data, to the user terminal 40 (S513). Here, the correction receiving section 35c adds to the confirmation screen an image indicated by the image data of the target form data included in the form database 34d, the character string indicated by the character data of the target form data included in the form database 34d, the first font name associated with the target form data in the correction information database 334f, the character string indicated by the character data generated through the OCR processing in the first font associated with the target form data in the correction information database 334f, the second font associated with the target form data in the correction information database 334f, the character string indicated by the character data generated through the OCR processing in the second font associated with the target form data in the correction information database 334f, and a notification corresponding to the notification type associated with the target form data in the correction information database 334f. The correction receiving section 35c adds to the confirmation screen a display of the difference between the character string indicated by the character data generated through the OCR processing in the first font and the character string indicated by the character data generated through the OCR processing in the second font. The notification corresponding to the notification type is for example a message stating "Please confirm only the differences between the character strings indicated by the character data generated through OCR processing in the respective fonts of two types" when the notification type is "high reliability". The notification corresponding to the notification type is for example a message stating "This is a form which has had several correction errors in the past. Please thoroughly confirm all items." when the notification type is "low reliability". The notification corresponding to the notification type is for example a message stating "OCR processing has been performed on a suboptimal area. Please thoroughly confirm all items." when the notification type is "suboptimal area". The notification corresponding to the notification type is for example a message stating "OCR processing has been performed in a suboptimal font. Please thoroughly confirm all items." when the notification type is "suboptimal font". The notification corresponding to the notification type is for example a message stating "OCR processing has been performed on a suboptimal area in a suboptimal font. Please thoroughly confirm all items." when the notification type is "suboptimal area and font".

After the processing of S513, the correction receiving section 35c of the form data management system 30 performs processing of S514 to S517 which is the same as the processing of S214 to S217 (refer to FIG. 17), and ends the operation illustrated in FIG. 21.

The issuer name mark 61 for specifying the issuer name 51 is a filling with a specific fluorescent color on at least a portion of the issuer name 51 in the above-described embodiments, but may be something other than a filling with a specific fluorescent color on at least a portion of the issuer name 51. For example, the issuer name mark 61 may not be a filling on at least a portion of the issuer name 51 but rather a box around at least a portion of the issuer name 51. Furthermore, the issuer name mark 61 may be drawn in a color other than a fluorescent color, such as red or blue. The issuer name mark 61 may be drawn in a color differing from that of the issuer-recorded content mark 62, or may be drawn in a color differing from that of the OCR reliability mark 63.

The issuer-recorded content mark 62 is a fluorescent colored box around the issuer-recorded content reading target area in the above-described embodiments, but may be something other than a fluorescent colored box around the issuer-recorded content reading target area. For example, the issuer-recorded content mark 62 may be drawn in a color other than a fluorescent color, such as red or blue. The issuer-recorded content mark 62 may be drawn in a color differing from that of the issuer name mark 61, or may be drawn in a color differing from that of the OCR reliability mark 63.

Figure 22:
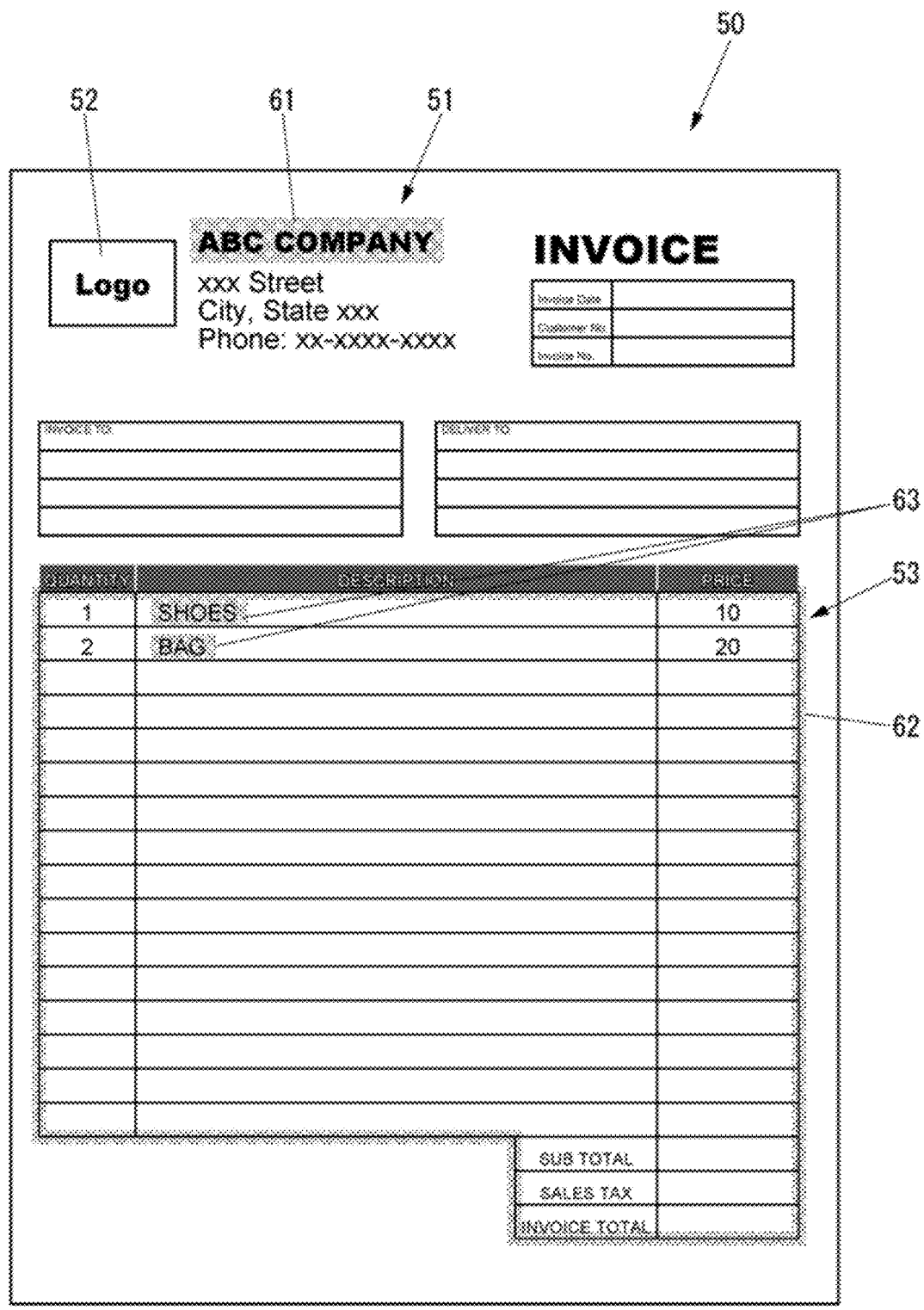
FIG. 22 is a diagram illustrating an example of the form illustrated in FIG. 2 with a specific mark applied thereto, differing from the example illustrated in FIG. 10.

The OCR reliability mark 63 is an X mark drawn in a fluorescent color in the above-described embodiments, but may be something other than an X mark drawn in a fluorescent color. For example, the OCR reliability mark 63 may be a mark such as a star mark or a check mark drawn outside of the range surrounded by the issuer-recorded content mark 62, or may be a mark such as a line drawn inside of the range surrounded by the issuer-recorded content mark 62 as illustrated in FIG. 22. The OCR reliability mark 63 may be drawn in a color differing from that of the issuer name mark 61, or may be drawn in a color differing from that of the issuer-recorded content mark 62. The OCR reliability mark 63 may be expressed in the color of at least one color of the issuer name mark 61 and the issuer-recorded content mark 62. For example, the OCR reliability mark 63 may be expressed in a fluorescent yellow as that of the issuer name mark 61 and the issuer-recorded content mark 62 when the reliability of OCR processing is high, or may be expressed in a fluorescent pink as that of the issuer name mark 61 and the issuer-recorded content mark 62 when the reliability of OCR processing is low.

The OCR reliability mark 63 is a mark indicating that the reliability of OCR processing is low in the above-described embodiments. However, the OCR reliability mark 63 may be a mark indicating that the reliability of OCR processing is high, or a mark indicating distinction between high-reliability OCR processing and low-reliability OCR processing.

In the above-described embodiments, the OCR performance section 35a of the form data management system 30 extracts characters from the same row as characters on which the issuer name mark 61 is superimposed in the image extracted in S131 among all of the characters included in the image extracted in S131 based on the positions detected in S132 and the positions detected in S133 (S134). However, the OCR performance section 35a may extract characters from the same row as the characters on which the issuer name mark 61 is superimposed in the image extracted in S131 among all of the characters included in the image extracted in S131 using a method other than the method in S134.

In the above-described embodiments, the OCR performance section 35a of the form data management system 30 performs processing only on the issuer name acquisition area in the issuer name acquisition processing by extracting the issuer name acquisition area in the issuer name acquisition processing (S131). Accordingly, the size of the area to be processed in the issuer name acquisition processing can be reduced in size in the OCR performance section 35a as compared to a configuration in which the entire target form image is to be processed in the issuer name acquisition processing. As a result, the size of the RAM of the controller 35 used in the issuer name acquisition processing can be reduced. However, the OCR performance section 35a may perform processing on the entire target form image without extracting the issuer name acquisition area in the issuer name acquisition processing.

In the above-described embodiments, the OCR performance section 35a of the form data management system 30 extracts a character string including characters on which the issuer name mark 61 is superimposed in the image extracted in S131 (S135) and acquires the character string extracted in S135 as an issuer name (S136). Here, the character string is composed by the characters extracted in S134, and a distance between mutually adjacent characters in the character string is no greater than a specific distance. However, the OCR performance section 35a may extract a character string including characters on which the issuer name mark 61 is superimposed in the image extracted in S131 and acquire the extracted character string as an issuer name in S136, wherein the character string is composed by the characters extracted in S134 and the entire length of the character string is no greater than a specific distance. Here, the specific distance may be a distance corresponding to character width such as the distance of twenty of the characters on which the issuer name mark 61 is superimposed, or may be a fixed distance independent of character width, such as 15 cm. Furthermore, the OCR performance section 35a may acquire a character string composed by all of the characters extracted in S134 as an issuer name in S136. Accordingly, the possibility of appropriately acquiring a character string desired by the user can be increased even in a case in which the issuer name mark 61 is not superimposed on at least one character of the character string desired by the user, that is, on the issuer name.

At least some of the functions of the form data management system 30 described in the above-described embodiments may be implemented not in the form data management system 30 but rather in an image forming apparatus. Similarly, at least some of the functions of the form data management system 30 described in the above-described embodiments may be implemented not in the form data management system 30 but in the user terminal 40.

The text of the present invention is a form in the above-described embodiments, but may be a text other than a form.

The present application further discloses the following appendices. Note that the following appendices are not limitations to the present invention.

(Appendix 1)

A text OCR program for acquiring character data from a text through OCR processing, the text OCR program causing a computer to realize:

an OCR information management section which manages OCR information in which identification information of an issuer of the text is associated with a type of a font used in the OCR processing; and an OCR performance section which performs the OCR processing on the text, wherein when performing the OCR processing on a specific area in the text, the OCR performance section performs the OCR processing in the font of the type associated in the OCR information with the identification information of the issuer of the text.

(Appendix 2)

An OCR method for acquiring character data from a text through OCR processing, the OCR method including:

managing OCR information in which identification information of an issuer of the text is associated with a type of a font used in the OCR processing; and performing the OCR processing on the text, wherein in the OCR performing, when the OCR processing is performed on a specific area in the text, the OCR processing is performed in the font of the type associated in the OCR information with the identification information of the issuer of the text.

(Appendix 3)

A text OCR program for acquiring character data from a text through OCR processing, the text OCR program causing a computer to realize:

an OCR information management section which manages OCR information in which identification information of an issuer of the text is associated with reliability of the OCR processing on the text issued by the issuer;

an OCR performance section which performs the OCR processing on the text; and a correction receiving section which receives correction of the character data, wherein when performing the OCR processing on a marked text as the text which is a text with a reliability mark for indicating the reliability applied thereto, the OCR performance section acquires the reliability indicated by the reliability mark, the OCR information management section adds to the OCR information the reliability acquired by the OCR performance section from the marked text, and when the character data of the text is corrected, the correction receiving section performs a notification corresponding to the reliability associated in the OCR information to the identification information of the issuer of the text.

(Appendix 4)

An OCR method for acquiring character data from a text through OCR processing, the text OCR method including:

managing OCR information in which identification information of an issuer of the text is associated with reliability of the OCR processing on the text issued by the issuer;

performing the OCR processing on the text; and receiving correction to the character data, wherein in the OCR performing, when the OCR processing is performed on a marked text as the text which is a text with a reliability mark for indicating the reliability applied thereto, the reliability indicated by the reliability mark is acquired, in the OCR information managing, the reliability acquired from the marked text through the OCR performance is added to the OCR information, and in the correction receiving, when the character data of the text is corrected, a notification is performed corresponding to the reliability associated in the OCR information with the identification information of the issuer of the text.

(Appendix 5)

An OCR system for acquiring character data from a text through OCR processing, the text OCR system including an OCR performance section which performs the OCR processing on the text, wherein when performing the OCR processing on a marked text as the text which is a text with a specific information mark for acquiring specific information applied thereto, the OCR performance section acquires a character string as the specific information, the character string being composed by at least a portion of characters in the same row as characters on which the specific information mark is superimposed, the character string including the characters on which the specific information mark is superimposed, the character string having an entire length of no greater than a specific distance.

(Appendix 6)

A text OCR program for acquiring character data from a text through OCR processing, the text OCR program causing a computer to realize an OCR performance section which performs the OCR processing on the text, wherein when performing the OCR processing on a marked text as the text which is a text with a specific information mark for acquiring specific information applied thereto, the OCR performance section acquires a character string as the specific information, the character string being composed by at least a portion of characters in the same row as characters on which the specific information mark is superimposed, the character string including the characters on which the specific information mark is superimposed, the character string having an internal distance between mutually adjacent characters of no greater than a specific distance.

(Appendix 7)

A text OCR program for acquiring character data from a text through OCR processing, the text OCR program causing a computer to realize an OCR performance section which performs the OCR processing on the text, wherein when performing the OCR processing on a marked text as the text which is a text with a specific information mark for acquiring specific information applied thereto, the OCR performance section acquires a character string as the specific information, the character string being composed by at least a portion of characters in the same row as characters on which the specific information mark is superimposed, the character string including the characters on which the specific information mark is superimposed, the character string having an entire length of no greater than a specific distance.

(Appendix 8)

An OCR method for acquiring character data from a text through OCR processing, the text OCR method including performing the OCR processing on the text, wherein in the OCR performance, when the OCR processing is performed on a marked text as the text which is a text with a specific information mark for acquiring specific information applied thereto, a character string is acquired as the specific information, the character string being composed by at least a portion of characters in the same row as characters on which the specific information mark is superimposed, the character string including the characters on which the specific information mark is superimposed, the character string having an internal distance between mutually adjacent characters of no greater than a specific distance.

(Appendix 9)

An OCR method for acquiring character data from a text through OCR processing, the text OCR method including
performing the OCR processing on the text, wherein
in the OCR performance, when the OCR processing is performed on a marked text as the text which is a text with a specific information mark for acquiring specific information applied thereto, a character string is acquired as the specific information, the character string being composed by at least a portion of characters in the same row as characters on which the specific information mark is superimposed, the character string including the characters on which the specific information mark is superimposed, the character string having an entire length of no greater than a specific distance.

The invention claimed is:

1. An OCR system which acquires character data from a text through OCR processing, the OCR system comprising:
    an OCR information management section configured to manage OCR information in which identification information of an issuer of the text is associated with reliability of the OCR processing on the text issued by the issuer;
    an OCR performance section configured to perform the OCR processing on the text; and
    a correction receiving section configured to receive correction of the character data, wherein
    when performing the OCR processing on a marked text as the text which is a text with a reliability mark for indicating the reliability applied thereto, the OCR performance section acquires the reliability indicated by the reliability mark,
    the OCR information management section adds to the OCR information the reliability acquired from the marked text by the OCR performance section, and
    when the character data of the text is corrected, the correction receiving section performs notification corresponding to the reliability associated in the OCR information with the identification information of the issuer of the text,
    wherein the reliability mark includes at least one of a mark indicating that the reliability is low, a mark indicating that the reliability is high, and a mark indicating distinction between high reliability and low reliability.

2. The OCR system according to claim 1, wherein
    the text includes the identification information of the issuer of the text,
    the OCR performance section acquires the identification information of the issuer of the text through OCR processing on the text, and
    when the character data of the text is corrected, the correction receiving section performs a notification corresponding to the reliability associated in the OCR information with the identification information acquired from the text by the OCR performance section.

3. The OCR system according to claim 1, wherein
    an identification information mark for acquiring the identification information of the issuer of the marked text is applied to the marked text,
    when performing the OCR processing on the marked text, the OCR performance section acquires the identification information specified by the identification information mark, and
    the OCR information management section adds to the OCR information the identification information acquired by the OCR performance section from the marked text.

4. The OCR system according to claim 1, wherein
    the OCR information associates a type of a font used in the OCR processing with the identification information, and
    when performing the OCR processing on a specific area in the text, the OCR performance section performs the OCR processing in the font of the type associated in the OCR information with the identification information of the issuer of the text.

5. The OCR system according to claim 4, wherein
    an area mark for specifying the specific area is applied to the marked text,
    when performing the OCR processing on the marked text, the OCR performance section specifies a type of a font of characters in the specific area specified by the area mark, and
    the OCR information management section adds to the OCR information the type specified by the OCR performance section from the marked text.

* * * * *